(12) United States Patent
Xia et al.

(10) Patent No.: US 12,078,818 B2
(45) Date of Patent: Sep. 3, 2024

(54) VOICE COIL MOTOR FOR DRIVING LIQUID LENS AND LENS ASSEMBLY HAVING VOICE COIL MOTOR

(71) Applicant: Huawei Technologies Co., Ltd., Shenzhen (CN)

(72) Inventors: Taihong Xia, Shenzhen (CN); Chuan Yang, Dongguan (CN); Jianwen Wang, Dongguan (CN); Haixia Jiang, Shanghai (CN); Lei Jiang, Tampere (FI); Dengfeng Li, Dongguan (CN); Yuandao Ju, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/434,661

(22) PCT Filed: Feb. 21, 2020

(86) PCT No.: PCT/CN2020/076126
§ 371 (c)(1),
(2) Date: Aug. 27, 2021

(87) PCT Pub. No.: WO2020/173393
PCT Pub. Date: Sep. 3, 2020

(65) Prior Publication Data
US 2022/0187615 A1    Jun. 16, 2022

(30) Foreign Application Priority Data

Feb. 28, 2019 (CN) .......................... 201910153565.6

(51) Int. Cl.
G02B 27/64     (2006.01)
G02B 3/14      (2006.01)
(Continued)

(52) U.S. Cl.
CPC ............. *G02B 27/646* (2013.01); *G02B 3/14* (2013.01); *G02B 26/004* (2013.01); *G03B 5/00* (2013.01);
(Continued)

(58) Field of Classification Search
CPC ......... G02B 27/646; G02B 3/14; G02B 26/04
See application file for complete search history.

(56) References Cited

U.S. PATENT DOCUMENTS 9,207,367 B2    12/2015  Wang et al.
2010/0232161 A1  9/2010  Aschwanden et al.
(Continued)

FOREIGN PATENT DOCUMENTS

CN    201066401 Y    5/2008
CN    102116994 A    7/2011
(Continued)

OTHER PUBLICATIONS

Machine translation of CN 103454749A retrieved electronically from Espacenet Jan. 8, 2024 (Year: 2024).*

*Primary Examiner* — Cara E Rakowski
(74) *Attorney, Agent, or Firm* — Conley Rose, P.C.

(57) ABSTRACT

A voice coil motor for driving a liquid lens and a lens assembly having a voice coil motor, where the voice coil motor includes a plurality of sub motor parts. The sub motor parts can be independently controlled. The sub motor part includes an unmovable part, a movable part, which can move along an optical axis direction relative to the unmovable part, a connection elastic piece coupled to the liquid lens and the movable part, where when a force is applied to the movable part in the optical axis direction, the movable part drives the connection elastic piece to squeeze the liquid lens.

20 Claims, 11 Drawing Sheets

(51) Int. Cl.
  *G02B 26/00* (2006.01)
  *G03B 5/00* (2021.01)
  *G03B 13/36* (2021.01)
  *H02K 11/33* (2016.01)
  *H02K 41/035* (2006.01)

(52) U.S. Cl.
  CPC ............. *G03B 13/36* (2013.01); *H02K 11/33* (2016.01); *H02K 41/0356* (2013.01); *G03B 2205/0007* (2013.01); *H02K 2211/03* (2013.01)

(56) References Cited

U.S. PATENT DOCUMENTS

| | | |
|---|---|---|
| 2011/0134303 A1 | 6/2011 | Jung et al. |
| 2011/0262122 A1 | 10/2011 | Minamisawa et al. |
| 2013/0215526 A1 | 8/2013 | Park |
| 2015/0049397 A1 | 2/2015 | Liu |
| 2016/0116703 A1 | 4/2016 | Cheng |
| 2016/0269644 A1 | 9/2016 | Cheong |
| 2017/0031173 A1 | 2/2017 | Dong et al. |
| 2017/0064184 A1* | 3/2017 | Tsai ................... G02B 7/36 |
| 2018/0234529 A1 | 8/2018 | Yu et al. |
| 2018/0316840 A1 | 11/2018 | Martin |
| 2019/0103799 A1 | 4/2019 | Kawanabe |
| 2019/0104239 A1 | 4/2019 | Aschwanden et al. |
| 2020/0213493 A1* | 7/2020 | Cheng ................ G02B 27/646 |
| 2020/0363565 A1* | 11/2020 | Aschwanden ....... G02B 27/646 |
| 2022/0206287 A1* | 6/2022 | Osaka .................... G03B 30/00 |

FOREIGN PATENT DOCUMENTS

| | | | | |
|---|---|---|---|---|
| CN | 102177465 | A | 9/2011 | |
| CN | 102375286 | A | 3/2012 | |
| CN | 102422185 | A | 4/2012 | |
| CN | 204945591 | U | 1/2016 | |
| CN | 105492952 | A | 4/2016 | |
| CN | 105974553 | A | 9/2016 | |
| CN | 107193106 | A | 9/2017 | |
| CN | 107329348 | A | 11/2017 | |
| CN | 103454749 | * | 12/2017 | ............... G02B 7/04 |
| CN | 207473171 | U | 6/2018 | |
| CN | 108427166 | A | 8/2018 | |
| CN | 207895211 | U | 9/2018 | |
| CN | 207946633 | U | 10/2018 | |
| CN | 109073791 | A | 12/2018 | |
| CN | 109143722 | A | 1/2019 | |
| CN | 109196759 | A | 1/2019 | |
| CN | 109975973 | A | 7/2019 | |
| EP | 3070514 | A1 | 9/2016 | |
| EP | 3312618 | A1 | 4/2018 | |
| EP | 3907545 | A1 | 11/2021 | |
| JP | 2013541319 | A | 11/2013 | |
| WO | 2017149092 | A2 | 9/2017 | |
| WO | 2018234573 | A1 | 12/2018 | |
| WO | 2019030129 | A1 | 2/2019 | |

* cited by examiner (a)

(b)

VOICE COIL MOTOR FOR DRIVING LIQUID LENS AND LENS ASSEMBLY HAVING VOICE COIL MOTOR

CROSS-REFERENCE TO RELATED APPLICATIONS

This application is a U.S. National Stage of International Patent Application No. PCT/CN2020/076126 filed on Feb. 21, 2020, which claims priority to Chinese Patent Application No. 201910153565.6 filed on Feb. 28, 2019. Both of the aforementioned applications are hereby incorporated by reference in their entireties.

TECHNICAL FIELD

Embodiments of this application relate to the field of lens drive devices, and more specifically, to a voice coil motor for driving a liquid lens and a lens assembly having a voice coil motor.

BACKGROUND

Auto focus (auto focus, AF) is a technology in which reflected light is imaged and received, based on a light reflection principle of a photographed object, on an image sensor after the light passes through a lens; then, an object distance of the photographed object is obtained through computer processing; and subsequently, a lens automatically moves based on the object distance to complete focusing.

Optical image stabilization (optical image stabilization, OIS) is a technology in which a gyroscope is used to perform shake detection, and then an OIS motor is used to pan or rotate an entire lens in a reverse direction, to compensate for image blur caused by shake of a terminal device during exposure.

For a conventional lens, different motor assemblies are usually used to drive the lens to move or rotate, to implement AF and OIS respectively. To meet a requirement of people for a micro zoom lens, a new optical element, that is, a liquid lens, that dynamically adjusts a refractive index of a lens or changes a surface shape of a lens to change a focal length and implement optical image stabilization appears.

For the liquid lens, both AF and OIS of the liquid lens may be implemented by driving of a same motor assembly. However, currently, when performing auto focus and optical image stabilization, the drive device of the liquid lens cannot precisely control displacement and deformation of the liquid lens, and therefore cannot achieve a good effect of auto focus and optical image stabilization.

SUMMARY

Embodiments of this application provide a voice coil motor for driving a liquid lens and a lens assembly having a voice coil motor, to precisely implement auto focus and optical image stabilization of a liquid lens.

According to a first aspect, a voice coil motor for driving a liquid lens is provided. The voice coil motor includes a plurality of sub motor parts. The plurality of sub motor parts can be independently controlled. The sub motor part includes: an unmovable part; a movable part, which can move along an optical axis direction relative to the unmovable part; a connection elastic piece, connected to a liquid lens and the movable part, where when a force is applied to the movable part in the optical axis direction, the movable part drives the connection elastic piece to squeeze the liquid lens, the connection elastic piece is a plate spring, and a stiffness coefficient of the connection elastic piece in the optical axis direction is greater than a stiffness coefficient of the connection elastic piece in a direction perpendicular to the optical axis direction; and a drive circuit part, configured to control a moving distance of the movable part.

In the voice coil motor provided in this application, the liquid lens is connected to the movable part of the voice coil motor by using the connection elastic piece, so that when a force is applied to the movable part of the voice coil motor, the movable part of the voice coil motor can keep moving in a single direction. In addition, the plurality of sub motor parts of the voice coil motor can be independently controlled, and the plurality of sub motor parts independently apply a force to the liquid lens. Therefore, displacement and deformation of the liquid lens can be more precisely controlled, and auto focus and optical image stabilization of the liquid lens can both be implemented.

With reference to the first aspect, in a possible implementation, the unmovable part includes a motor base part, and a coil and a circuit board that are fastened on the motor base part, where the coil is fastened on the circuit board and is electrically connected to the circuit board; and the movable part includes a magnet disposed opposite to the coil.

With reference to the first aspect, in a possible implementation, the movable part further includes a U-shaped separating magnetic piece; the magnet is fastened on an inner side wall of the U-shaped separating magnetic piece, and magnetic isolation space formed by the U-shaped separating magnetic piece further accommodates the coil and the circuit board; and a lower part of the connection elastic piece is fixedly connected to an outer side wall of the U-shaped separating magnetic piece.

The U-shaped separating magnetic piece can reduce magnetic leakage generated when the magnet and the coil are powered on, and a motor thrust force can be increased.

With reference to the first aspect, in a possible implementation, the unmovable part includes a motor base part and a magnet that is stationary relative to the motor base part; and the movable part includes a circuit board and a coil fastened on the circuit board, and the coil is disposed opposite to the magnet.

By using a movement manner in which the magnet is stationary and the coil is movable, the weight of the movable part can be reduced, and mechanical reliability of the voice coil motor can be improved.

With reference to the first aspect, in a possible implementation, the unmovable part further includes a U-shaped separating magnetic piece; the magnet is fastened on an inner side wall of the U-shaped separating magnetic piece, and magnetic isolation space formed by the U-shaped separating magnetic piece further accommodates the coil and the circuit board; and a lower part of the connection elastic piece is fixedly connected to the circuit board, a side wall of the U-shaped separating magnetic piece has an opening along the optical axis direction, and the connection elastic piece drives, through the opening, the circuit board to move.

The U-shaped separating magnetic piece can reduce magnetic leakage generated when the magnet and the coil are powered on, and a motor thrust force can be increased.

With reference to the first aspect, in a possible implementation, motor base parts of the plurality of sub motor parts form an integral motor base.

With reference to the first aspect, in a possible implementation, the drive circuit part includes a drive and Hall integrated circuit, and the drive and Hall integrated circuit is located at a center of the coil and is fastened on the circuit board, to implement closed-loop control over the moving distance of the movable part.

The drive and Hall integrated circuit is used to implement closed-loop control over the movable part of the voice coil motor, so that displacement of the movable part can be more precisely controlled. In this way, displacement and deformation of the liquid lens can be more accurately controlled, and better auto focus and optical image stabilization effects can be achieved.

With reference to the first aspect, in a possible implementation, the drive circuit part further includes a micro control unit MCU, and the MCU obtains an auto focus instruction and/or an optical image stabilization instruction, and outputs a motor displacement instruction to the drive and Hall integrated circuit after performing calculation by using a superposition and combination algorithm, to perform closed-loop control over the sub motor part.

Because the movable part of the voice coil motor moves in a single direction, namely, the optical axis direction, a motor displacement instruction is obtained through calculation based on the auto focus instruction and the optical image stabilization instruction in a superposition and combination manner, the motor displacement instruction is executed to implement auto focus and optical image stabilization.

With reference to the first aspect, in a possible implementation, the sub motor part further includes a squeezing member part, the squeezing member part includes an arc squeezing portion and a lug disposed on a circumference of the arc squeezing portion, and the connection elastic piece is connected to the lug of the squeezing member part.

With reference to the first aspect, in a possible implementation, arc squeezing portions of the plurality of sub motor parts form an integral circular squeezing portion.

With reference to the first aspect, in a possible implementation, the sub motor part further includes an upper support elastic piece and a lower support elastic piece that support and suspend the movable part, where an end that is of the upper support elastic piece and that is close to a motor cavity is fastened to the movable part, and the other end of the upper support elastic piece is fastened to the unmovable part; and an end that is of the lower support elastic piece and that is close to the motor cavity is fastened to the movable part, and the other end of the lower support elastic piece is fastened to the unmovable part.

The upper support elastic piece and the lower support elastic piece of the voice coil motor can control the movable part of the voice coil motor not to move in a direction perpendicular to an optical axis, further to enable the movable part to move in a single direction.

With reference to the first aspect, in a possible implementation, upper support elastic pieces of the plurality of sub motor parts form an integral upper support elastic piece, and/or lower support elastic pieces of the plurality of sub motor parts form an integral lower support elastic piece.

With reference to the first aspect, in a possible implementation, the plurality of sub motor parts are arranged on four sides of the voice coil motor around an optical axis.

With reference to the first aspect, in a possible implementation, a maximum driving force generated by interaction of the coil and the magnet is less than a force that deforms the connection elastic piece in the optical axis direction.

According to a second aspect, a lens assembly is provided, and includes a liquid lens and a voice coil motor for driving the liquid lens. The voice coil motor includes a plurality of sub motor parts. The plurality of sub motor parts can be independently controlled. The sub motor part includes: an unmovable part; a movable part, which can move along an optical axis direction relative to the unmovable part; a connection elastic piece, connected to the liquid lens and the movable part, where when a force is applied to the movable part in the optical axis direction, the movable part drives the connection elastic piece to squeeze the liquid lens, the connection elastic piece is a plate spring, and a stiffness coefficient of the connection elastic piece in the optical axis direction is greater than a stiffness coefficient of the connection elastic piece in a direction perpendicular to the optical axis direction; and a drive circuit part, configured to control a moving distance of the movable part.

In the voice coil motor provided in this application, the liquid lens is connected to the movable part of the voice coil motor by using the connection elastic piece, so that when a force is applied to the movable part of the voice coil motor, the movable part of the voice coil motor can keep moving in a single direction. In addition, the plurality of sub motor parts of the voice coil motor can be independently controlled, and the plurality of sub motor parts independently apply a force to the liquid lens. Therefore, displacement and deformation of the liquid lens can be more precisely controlled, and auto focus and optical image stabilization of the liquid lens can both be implemented.

With reference to the second aspect, in a possible implementation, the unmovable part includes a motor base part, and a coil and a circuit board that are fastened on the motor base part, where the coil is fastened on the circuit board and is electrically connected to the circuit board; and the movable part includes a magnet disposed opposite to the coil.

With reference to the second aspect, in a possible implementation, the movable part further includes a U-shaped separating magnetic piece; the magnet is fastened on an inner side wall of the U-shaped separating magnetic piece, and magnetic isolation space formed by the U-shaped separating magnetic piece further accommodates the coil and the circuit board; and a lower part of the connection elastic piece is fixedly connected to an outer side wall of the U-shaped separating magnetic piece.

The U-shaped separating magnetic piece can reduce magnetic leakage generated when the magnet and the coil are powered on, and a motor thrust force can be increased.

With reference to the second aspect, in a possible implementation, the unmovable part includes a motor base part and a magnet that is stationary relative to the motor base part; and the movable part includes a circuit board and a coil fastened on the circuit board, and the coil is disposed opposite to the magnet.

With reference to the second aspect, in a possible implementation, the unmovable part further includes a U-shaped separating magnetic piece; the magnet is fastened on an inner side wall of the U-shaped separating magnetic piece, and magnetic isolation space formed by the U-shaped separating magnetic piece further accommodates the coil and the circuit board; and a lower part of the connection elastic piece is fixedly connected to the circuit board, a side wall of the U-shaped separating magnetic piece has an opening along the optical axis direction, and the connection elastic piece drives, through the opening, the circuit board to move.

The U-shaped separating magnetic piece can reduce magnetic leakage generated when the magnet and the coil are powered on, and a motor thrust force can be increased.

With reference to the second aspect, in a possible implementation, motor base parts of the plurality of sub motor parts form an integral motor base.

With reference to the second aspect, in a possible implementation, the drive circuit part includes a drive and Hall integrated circuit, and the drive and Hall integrated circuit is located at a center of the coil and is fastened on the circuit board, to implement closed-loop control over the moving distance of the movable part.

The drive and Hall integrated circuit is used to implement closed-loop control over the movable part of the voice coil motor, so that displacement of the movable part can be more precisely controlled. In this way, displacement and deformation of the liquid lens can be more accurately controlled, and better auto focus and optical image stabilization effects can be achieved.

With reference to the second aspect, in a possible implementation, the drive circuit part further includes a micro control unit MCU, and the MCU obtains an auto focus instruction and/or an optical image stabilization instruction, and outputs a motor displacement instruction to the drive and Hall integrated circuit after performing calculation by using a superposition and combination algorithm, to perform closed-loop control over the sub motor part.

Because the movable part of the voice coil motor moves in a single direction, namely, the optical axis direction, a motor displacement instruction is obtained through calculation based on the auto focus instruction and the optical image stabilization instruction in a superposition and combination manner, the motor displacement instruction is executed to implement auto focus and optical image stabilization.

With reference to the second aspect, in a possible implementation, the sub motor part further includes a squeezing member part, the squeezing member part includes an arc squeezing portion and a lug disposed on a circumference of the arc squeezing portion, and the connection elastic piece is connected to the lug of the squeezing member part.

With reference to the second aspect, in a possible implementation, arc squeezing portions of the plurality of sub motor parts form an integral circular squeezing portion.

With reference to the second aspect, in a possible implementation, the sub motor part further includes an upper support elastic piece and a lower support elastic piece that support and suspend the movable part, where an end that is of the upper support elastic piece and that is close to a motor cavity is fastened to the movable part, and the other end of the upper support elastic piece is fastened to the unmovable part; and an end that is of the lower support elastic piece and that is close to the motor cavity is fastened to the movable part, and the other end of the lower support elastic piece is fastened to the unmovable part.

The upper support elastic piece and the lower support elastic piece of the voice coil motor can control the movable part of the voice coil motor not to move in a direction perpendicular to an optical axis, further to enable the movable part to move in a single direction.

With reference to the second aspect, in a possible implementation, upper support elastic pieces of the plurality of sub motor parts form an integral upper support elastic piece, and/or lower support elastic pieces of the plurality of sub motor parts form an integral lower support elastic piece.

With reference to the second aspect, in a possible implementation, the plurality of sub motor parts are arranged on four sides of the voice coil motor around an optical axis.

With reference to the second aspect, in a possible implementation, a maximum driving force generated by interaction of the coil and the magnet is less than a force that deforms the connection elastic piece in the optical axis direction.

With reference to the second aspect, in a possible implementation, the lens assembly further includes a housing, the housing coordinates with the motor base parts of the plurality of sub motor parts and has an opening, and space formed by the housing and the motor base parts of the plurality of sub motor parts is used to accommodate the voice coil motor and the liquid lens.

With reference to the second aspect, in a possible implementation, the lens assembly further includes a liquid lens support bracket, the housing is provided with a supportive plate, and the supportive plate is connected to the support bracket.

DESCRIPTION OF EMBODIMENTS

The following describes technical solutions of embodiments in this application with reference to the accompanying drawings.

In application scenarios such as photographing and filming, a focal position of a camera or a lens usually needs to be changed to implement auto focus and optical image stabilization.

Auto focus (auto focus, AF) is a technology in which light reflected by a photographed object is imaged and received, based on a light reflection principle of the photographed object, on an image sensor after the light passes through a lens; then, an object distance of the photographed object is obtained through computer processing; and subsequently, a lens automatically moves based on the object distance to complete focusing.

Optical image stabilization (optical image stabilization, OIS) is a technology in which in an imaging apparatus such as a camera, an optical component is disposed, for example, a lens is disposed, to avoid or reduce a device shake that occurs in a process of capturing an optical signal, so as to improve imaging quality. A common method is to perform shake detection by using a gyroscope, and then an OIS motor is used to pan or rotate an entire lens in a reverse direction, to compensate for image blur caused by shake of an imaging device during exposure.

When a conventional lens performs auto focus and optical image stabilization, the entire lens needs to move by a specific distance or rotate for a specific angle to implement optical zoom, and moreover, auto focus and optical image stabilization of the lens are implemented by using different motor assemblies. To meet a requirement of people for miniaturization of a lens, a new optical element, that is, a liquid lens, that can dynamically adjust a refractive index of a lens or change a surface shape (a curvature) of a lens to change a focal length and implement optical image stabilization appears.

Figure 1:
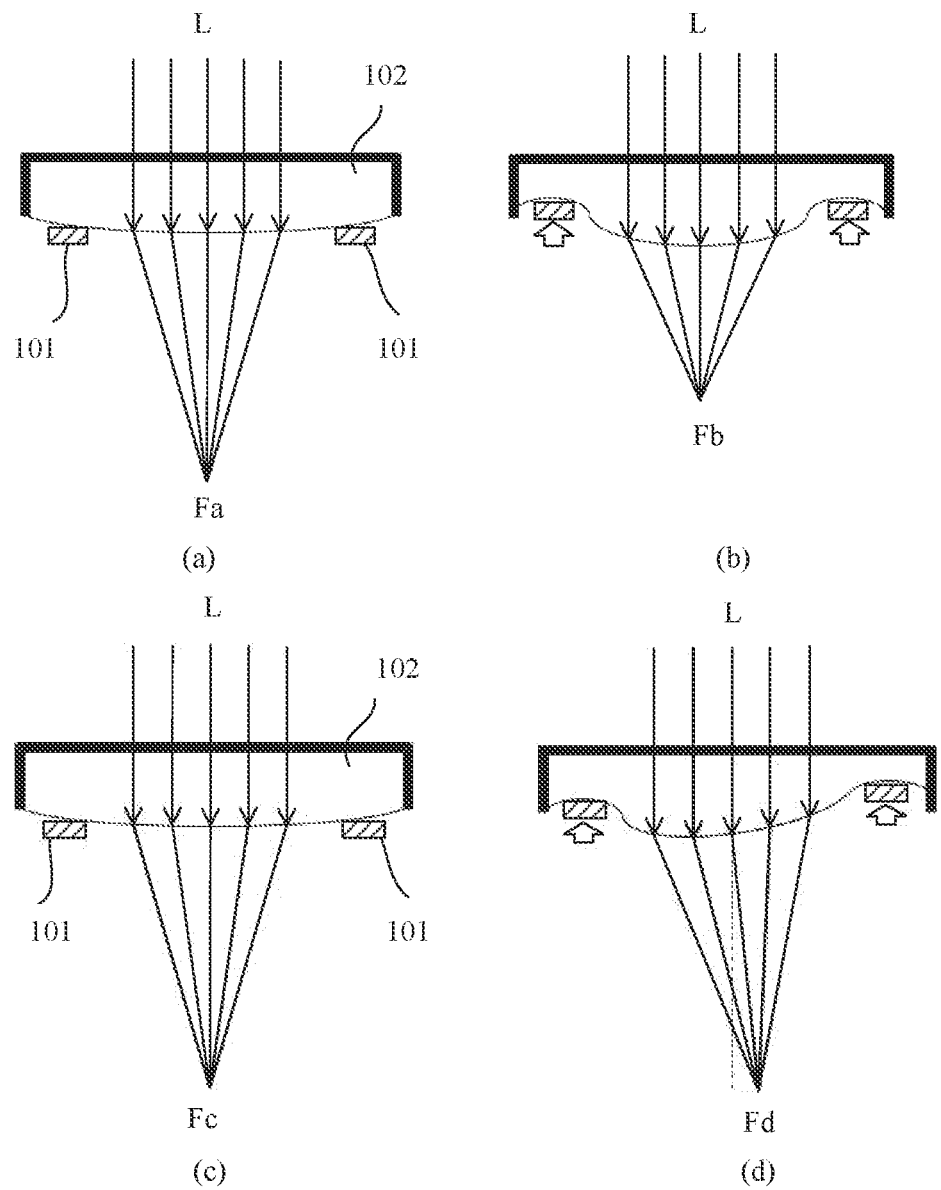
FIG. 1 is a schematic diagram of a principle that a liquid lens performs auto focus and optical image stabilization according to an embodiment of this application.

The liquid lens has a variable curvature, and is an optical element that is made of one or more liquids without mechanical connection. An internal parameter of the optical element can be changed through external control. The liquid lens has performance that a conventional optical lens does not have. FIG. 1 shows a principle that a liquid lens performs auto focus and optical image stabilization.

When auto focus is performed on the liquid lens, the liquid lens may be squeezed by using a motor or an electrostatic force in relatively small space and a relatively small size, so that a shape of a surface (that is, a refracting surface) of the liquid lens changes relatively evenly, and a focus moves up and down along the center of an optical axis. As shown in (a) and (b) in FIG. 1, squeezing members 101 are disposed on one side of the refracting surface of the liquid lens 102. During auto focus, the squeezing members 101 move toward the liquid lens 102 along an optical axis direction under a driving force of the motor, to squeeze the liquid lens 102. After a periphery of the liquid lens 102 is evenly squeezed, a curved surface of the lens becomes more curved, and after light L passes through the liquid lens 102, a refraction angle increases, so that the focus moves upward along the center of the optical axis. As can be learned from the figure, after auto focus, the focus of the liquid lens 102 changes from a focus Fa in (a) to a focus Fb in (b). Both the focus Fa and the focus Fb are located at the center of the optical axis.

When optical image stabilization is performed on the liquid lens, the lens may be squeezed by using a motor or an electrostatic force, so that a shape of a surface (that is, a refracting surface) changes relatively unevenly, and a focus deviates from the center of the optical axis. As shown in (c) and (d) in FIG. 1, squeezing members 101 are disposed on one side of the refracting surface of the liquid lens 102. During optical image stabilization, the squeezing members 101 move toward the liquid lens 102 under a driving force of the motor, to squeeze the liquid lens 102. Because the squeezing members 101 move by different distances at a plurality of positions on the liquid lens, the periphery of the liquid lens 102 is squeezed unevenly, bending degrees of the curved surface of the lens are inconsistent, and refraction angles of the light L are different after the light L symmetrical about the optical axis passes through the liquid lens 102, so that the focus deviates from the center of the optical axis, and shake of an imaging device during exposure is reversely compensated for by deviation of the focus, to achieve clear imaging. As can be learned from the figure, after optical image stabilization, the focus of the liquid lens 102 changes from a focus Fc in (c) to a focus Fd in (d).

During auto focus or optical image stabilization of the lens, a voice coil motor (voice coil motor, VCM) is usually used to drive the lens to pan or rotate. In the voice coil motor for driving the lens, a movement direction in which the movable part drives the lens to move to perform auto focus is usually different from a movement direction for performing optical image stabilization. For example, for a conventional lens, movement of a movable part along an optical axis direction can enable the lens to pan along the optical axis direction to implement auto focus, and angular movement of the movable part in a direction perpendicular to an optical axis can enable the lens to rotate to implement optical image stabilization. Therefore, such a voice coil motor requires relatively large inner space to satisfy movement of the movable part in different directions, and motor assemblies configured to implement auto focus and optical image stabilization need to be separately controlled. For a liquid lens, movement of movable parts along an optical axis direction enables even squeezing on a refracting surface of the liquid lens to implement auto focus, and enables uneven squeezing on the refracting surface of the liquid lens to implement optical image stabilization. Auto focus and optical image stabilization can be implemented by using a same group of motor assemblies, but when the movable parts of the motor perform optical image stabilization, because the refracting surface of the liquid lens needs to be unevenly squeezed, the movable parts of the motor that are used to squeeze the liquid lens, for example, oppositely disposed movable parts of the motor, move by different distances in the optical axis direction, and this causes displacement of the movable parts of the motor in the direction perpendicular to the optical axis. After the motor assembly tilts (tilt), a distance between the movable part (such as a coil) and an unmovable part (such as a magnet) changes, and correspondingly, an electromagnetic force used to push the movable part also changes. Consequently, displacement of the movable part of the motor in a vertical direction cannot be precisely controlled. Therefore, regardless of which type of lens is used to perform optical image stabilization and/or auto focus, neither displacement nor deformation of the lens can be more precisely controlled.

This embodiment of this application provides a voice coil motor for driving a liquid lens, to precisely control deformation and displacement of the liquid lens, and implement auto focus and optical image stabilization.

It should be understood that the voice coil motor in this embodiment of this application is not limited to being configured to drive the liquid lens, and may be further configured to drive a conventional lens. In this embodiment of this application, an example in which the voice coil motor is configured to drive the liquid lens is used for description.

The embodiments of this application are described below in detail with reference to the accompanying drawings.

Figure 2:
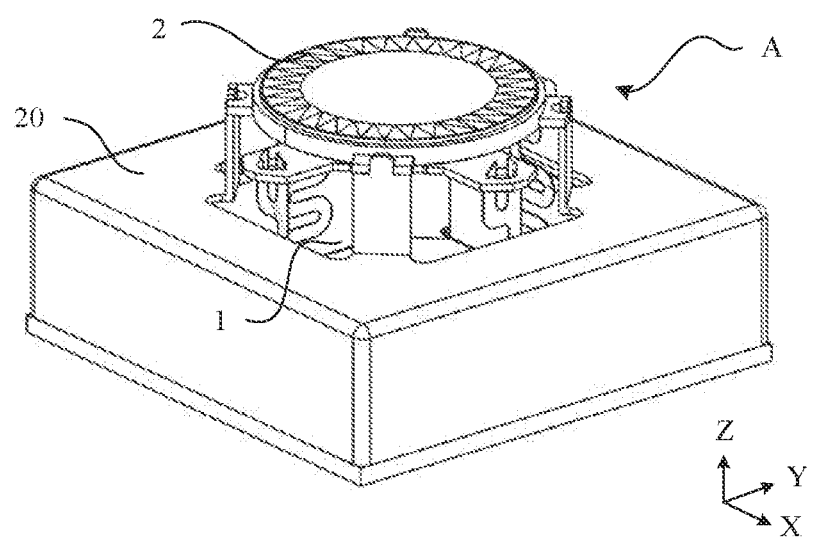
FIG. 2 is an axonometric view of a lens assembly according to an embodiment of this application.

FIG. 2 is an axonometric view of a lens assembly.

The lens assembly A has an AF function and an OIS function. By performing automatic focusing and optical image stabilization, when an object is photographed, an image can be photographed without blurring the image. As shown in the figure, the lens assembly A mainly includes a voice coil motor 1, a liquid lens sub-assembly 2, and a housing 20. The voice coil motor 1 is configured to: convert electric energy into mechanical energy, and generate regular movement, for example, linear or finite angular movement, through interaction between magnetic poles in a magnetic field from a permanent magnetic steel and a magnetic field generated by an electrified coil conductor, to drive a liquid lens in the liquid lens sub-assembly 2 to move.

For ease of description, the following defines that an optical axis direction of the lens is a direction Z, a direction side of the photographed object in the optical axis direction is a front side, a direction side opposite to the photographed object is a rear side, and a first direction perpendicular to an optical axis is a direction X. As shown in FIG. 2, the direction X is parallel to an edge of the voice coil motor 1 in the lower left corner in FIG. 2. A second direction perpendicular to the optical axis and the first direction is a direction Y. As shown in FIG. 2, the direction Y is parallel to an edge of the voice coil motor 1 in the lower right corner in FIG. 2. In the directions X and Y, a direction close to the optical axis is an inner side, and a direction opposite to the optical axis direction is an outer side. Similarly, definitions of the directions X, Y, and Z and the front, rear, inner, and outer sides are also applicable to the accompanying drawings to be described below.

It should be noted that the foregoing definitions of the directions X, Y, and Z, the front side, the rear side, the inner direction, and the outer direction are merely used to conveniently describe a position relationship or a connection relationship between components of the voice coil motor in the embodiments of this application, and do not constitute a limitation on the embodiments of this application.

It should be further noted that, for same parts or components in the embodiments of this application, it is possible that only one of the parts or components is marked with a drawing reference sign as an example in a figure. It should be understood that, for other same parts or parts, the drawing reference sign is also applicable.

Figure 3:
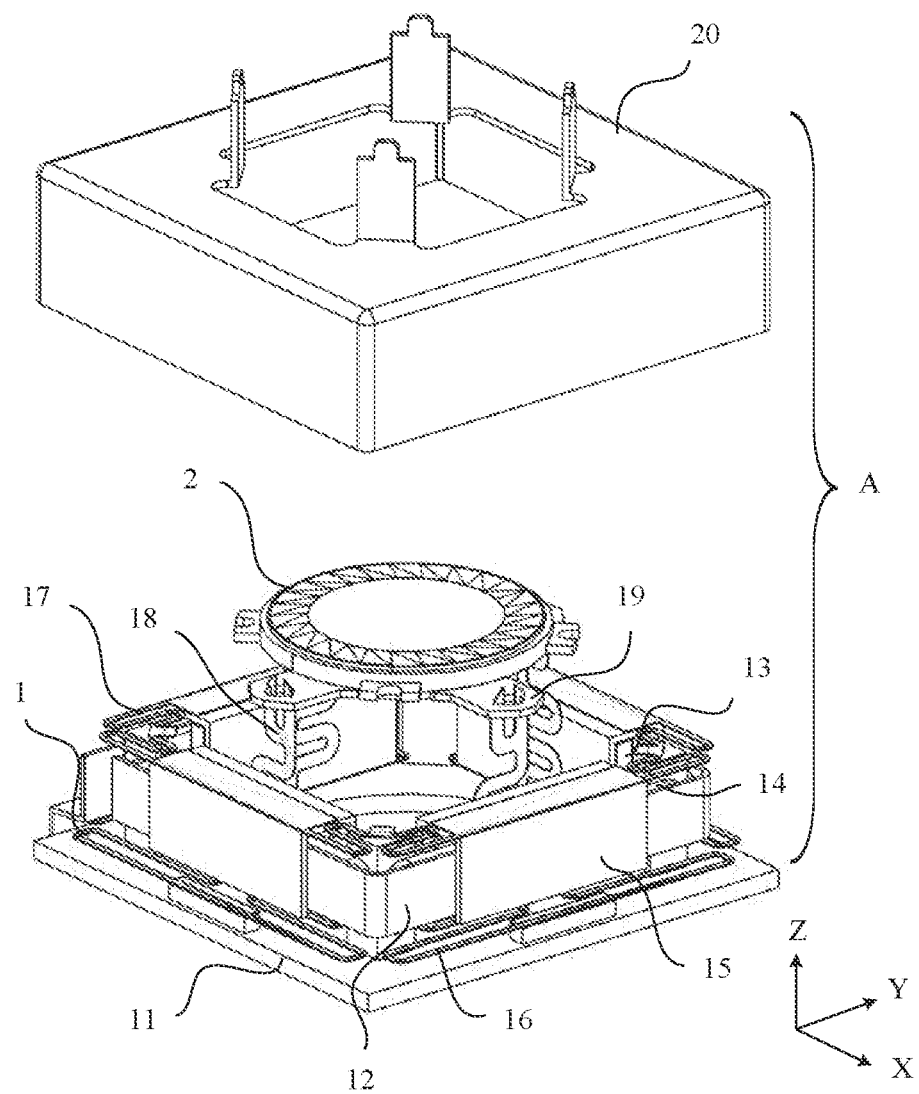
FIG. 3 is an upper exploded perspective view of a lens assembly according to an embodiment of this application.
Figure 4:
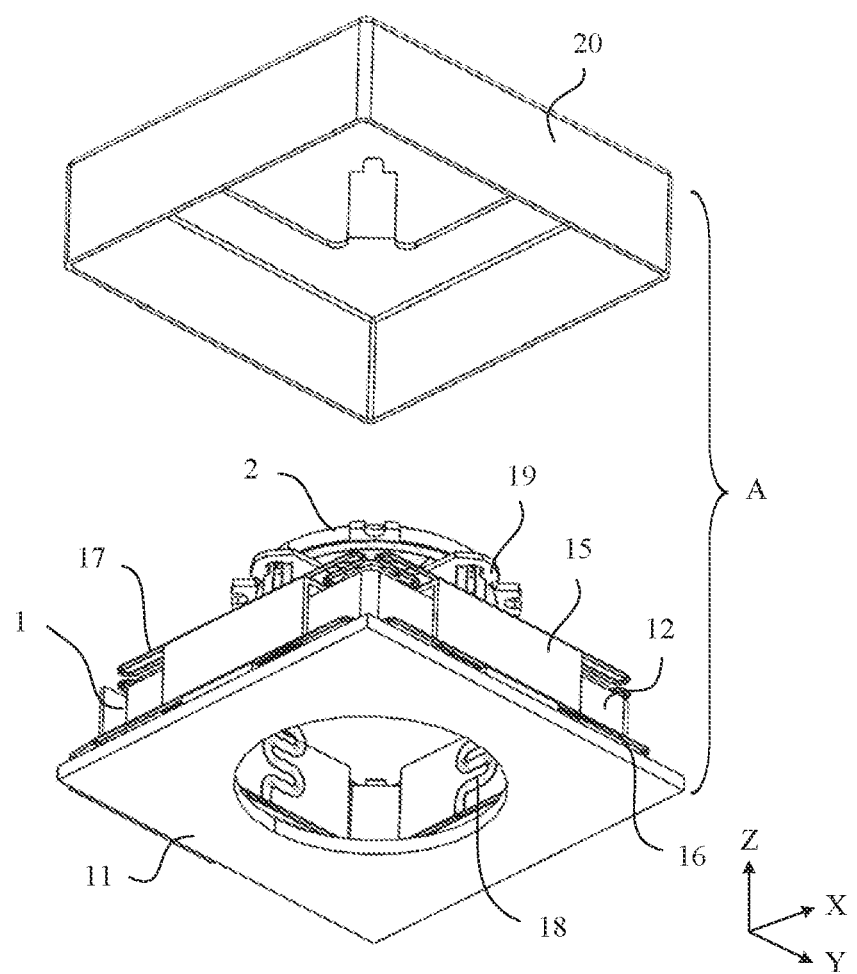
FIG. 4 is a lower exploded perspective view of a lens assembly according to an embodiment of this application.

FIG. 3 and FIG. 4 are exploded perspective views of the lens assembly A. FIG. 3 is an upper exploded perspective view, and FIG. 4 is a lower exploded perspective view.

The voice coil motor 1 in this embodiment of this embodiment includes a plurality of sub motor parts. The plurality of sub motor parts can be controlled independently. For example, a control instruction is input to each of the plurality of sub motor parts, so that the plurality of sub motor parts move independently. Alternatively, the plurality of sub motor parts may be controlled together. For example, a same instruction is input to the plurality of sub motor parts, so that the plurality of sub motor parts move synchronously. Certainly, a same instruction may alternatively be input to several sub motor parts in the plurality of sub motor parts, to control movement of the several sub motor parts. In other words, the plurality of sub motor parts may be independently controlled to move independently, the plurality of sub motor parts may be controlled to move together, or the plurality of sub motor parts may be divided into a plurality of groups to independently control the plurality of groups of sub motor parts.

Each sub motor part mainly includes: a motor base part 11, a circuit board 12, a magnet 13, a coil 14, a U-shaped separating magnetic piece 15, a lower support elastic piece 16, an upper support elastic piece 17, a connection elastic piece 18, and a squeezing member part 19.

It should be noted that the voice coil motor in this embodiment of this application includes a plurality of sub motor parts, that is, the voice coil motor includes at least two sub motor parts. In FIG. 3, FIG. 4, and the following figures, to clearly display the components of the sub motor part, the plurality of sub motor parts are marked with drawing reference signs to describe one of the sub motor parts. However, it should be understood that unless otherwise specified, content described for the drawing reference signs in the figures is described for one of the sub motor parts.

In this embodiment of this application, the voice coil motor includes four sub motor parts, and the four sub motor parts are respectively located on four sides of the voice coil motor. It should be understood that, in some other implementations, the voice coil motor may include another quantity of sub motor parts, for example, two, three, six, eight, or more sub motor parts.

Figure 5:
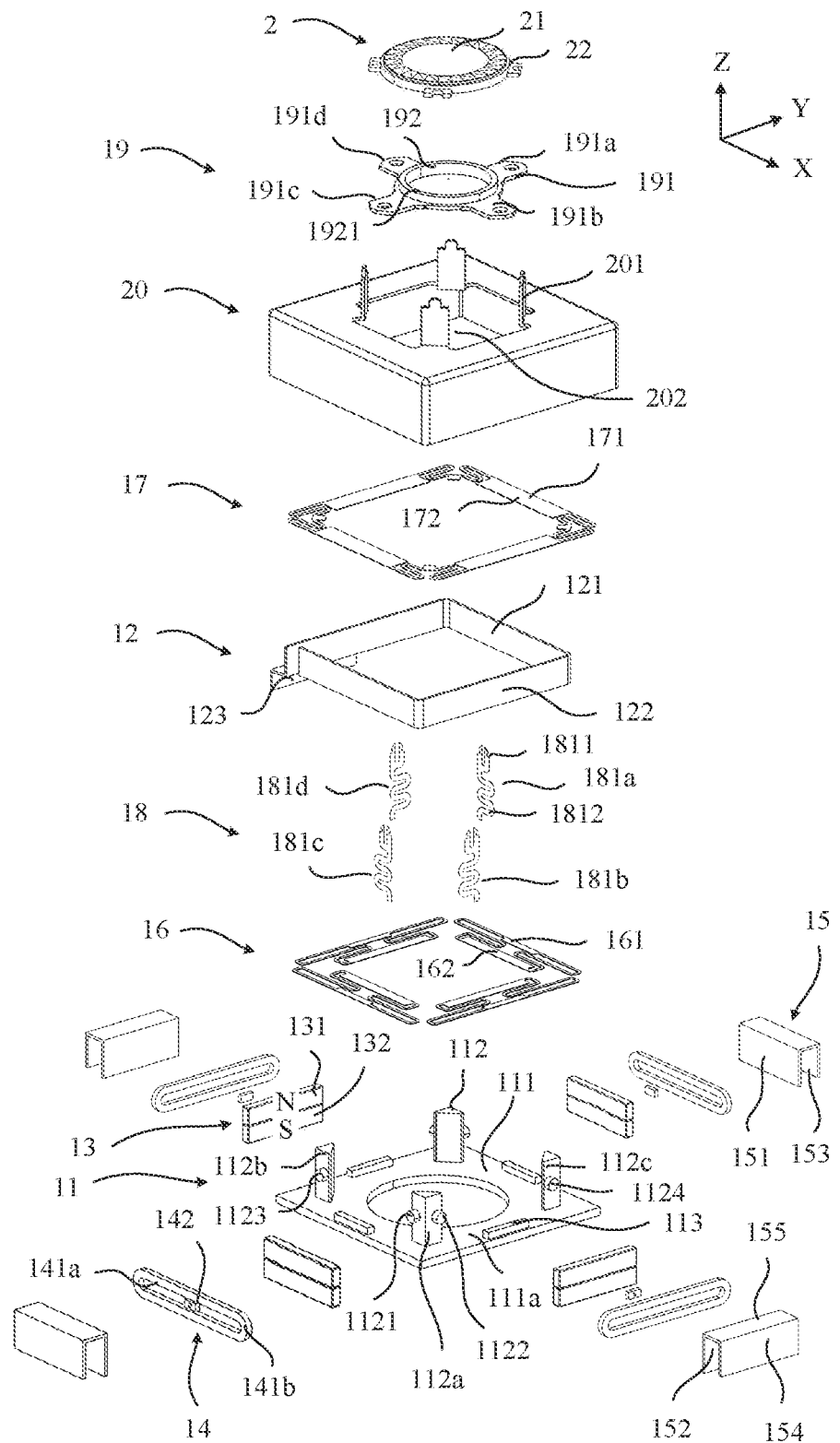
FIG. 5 is an exploded perspective view of a voice coil motor according to an embodiment of this application.

The voice coil motor 1 is integrally rectangular. Space formed by the housing 20 and motor base parts 11 of the plurality of sub motor parts is used to accommodate other assemblies of the voice coil motor or other assemblies of the lens assembly A. FIG. 5 is an exploded perspective view of the voice coil motor. A structure of the voice coil motor is described in detail below with reference to FIG. 5.

The motor base part 11 includes a baseplate part 111*a* and a coil fastening base 112. The motor base part 11 is located on a rearmost side of the voice coil motor in the optical axis direction, or may alternatively be considered as being located at the bottom layer of the voice coil motor, and is configured to support a corresponding sub motor part structure. The motor base parts 11 of the plurality of sub motor parts are configured to support an entire motor and module structure.

The coil fastening bases 112 are disposed at two ends of a front-end face of the baseplate part 111*a*, and are configured to fasten the coil 14 and the upper support elastic piece 17. A coil fastening post is disposed on the coil fastening base 112, and is configured to fasten the coil 14. As shown in FIG. 5, a coil fastening base 112*a* is provided with a coil fastening post 1122, a coil fastening base 112*c* is provided with a coil fastening post 1124, the coil fastening post 1122 fastens one end of the coil 14, and the coil fastening post 1124 fastens the other end of the coil 14. In this embodiment of this application, the coil fastening base 112*a* provided with the coil fastening post 1122, the coil fastening base 112*c* provided with the coil fastening post 1124, and the baseplate part 111*a* configured to support and fasten the coil fastening base 112*a* and the coil fastening base 112*c* may form a motor base part 11 of a sub motor part.

Preferably, the motor base parts 11 of the plurality of sub motor parts may form an integral motor base, in other words, baseplate parts 111*a* of the plurality of motor base parts may form an integral baseplate, neighboring sub motor parts may share one coil fastening base, and so on. In this embodiment of this application, an example in which an integral motor base is used for the voice coil motor is used for description. It should be understood that another structure disposed on the integral motor base is also applicable to motor base parts of a plurality of sub motors.

An integral motor base may include an integral baseplate 111 and a coil fastening base 112. As shown in FIG. 5, the integral baseplate 111 is generally square, and a hole is formed at the center of the integral baseplate 111. The coil fastening base 112 is disposed at a corner of a front-end face of the integral baseplate 111. The coil fastening base 112*a* is provided with the coil fastening posts 1121 and 1122 on a side face parallel to the optical axis direction. During specific implementation, the coil fastening post 1121 on the coil fastening base 112*a* and a coil fastening post 1123 on another neighboring coil fastening base 112*b* may fasten two ends of a coil 14. The coil fastening post 1122 on the coil fastening base 112*a* and the coil fastening post 1124 on the neighboring coil fastening base 112*c* may fasten two ends of another coil 14.

Certainly, in another implementation, the coil fastening base 112 may alternatively be disposed at another position of the integral baseplate 111, for example, disposed on four sides of the integral baseplate 111. A quantity of coil fastening bases 112 disposed on the integral baseplate 111 is not limited to four, and another quantity of coil fastening bases 112, for example, eight coil fastening bases 112, may also be disposed. A quantity of coil fastening posts disposed on each coil fastening base 112 is not limited to two, and there may be another quantity of coil fastening posts.

In another implementation, the coil fastening post configured to fasten the coil 14 may be of a hook type or another type that can fasten the coil 14.

The coil fastening base 112 may be integrated with the integral baseplate 111, or may be connected to the integral baseplate 111 through welding, bonding, or the like.

Optionally, the coil fastening base 112 may be a cuboid, a triangular prism, a quadrangular prism, a polygonal prism, a cylinder, or the like. This is not limited in this embodiment of this application.

Optionally, a boss 113 may further be disposed on the integral baseplate 111, and is configured to support the lower support elastic piece 16.

The coil 14 may be a circular coil. Two long sides of the coil 14 are perpendicular to an optical axis, and the coil 14 corresponds to four sub motor parts. Four coils 14 are arranged on four sides of the voice coil motor. Two ends of each coil 14 are separately fastened to coil fastening posts on two neighboring coil fastening bases 112. Using one of the coils 14 as an example, two ends 141a and 141b of the coil 14 are separately fastened to the coil fastening post 1123 on the coil fastening base 112b and the coil fastening post 1121 on the coil fastening base 112a.

In another implementation, the coil 14 is not limited to a circular coil, and may be in another shape. A quantity of coils 14 of each sub motor part is not limited to one, for example, may be two, four, or more. A proper shape of coil 14 and a proper quantity of coils 14 may be configured based on a setting of the coil fastening base 112.

To precisely control displacement and deformation of the liquid lens, the voice coil motor in this embodiment of this application may be a drive and Hall integral IC 142 used for closed-loop control. The drive and Hall integral IC 142 is located in the middle of the coil 14, and is configured to: detect displacement of the voice coil motor, and drive, based on a detection result, the voice coil motor to move.

The circuit board 12 is disposed on an outer side of the drive and Hall integral IC 142. This is equivalent to that the circuit board 12 is disposed on an outer side of the coil 14. The circuit board 12 may be connected to the drive and Hall integral IC 142 in a welding manner. The coil 14 is fastened on the circuit board 12, is electrically connected to the circuit board 12, and is configured to implement an electrical connection of the drive and Hall integral IC 142 and wiring of the coil 14. As shown in the figure, the drive and Hall integral IC 142 may be welded to an inner side face 121 of the circuit board 12, and the coil 14 faces toward the inner side face 121 of the circuit board 12.

In some implementations, the circuit board 12 may be a flexible printed circuit board (flexible printed circuit board, FPCB), a printed circuit board (printed circuit board, PCB), or another electronic device that can implement wiring of a coil.

In some implementations, circuit boards 12 corresponding to all coils 14 of the plurality of sub motor parts may be integrated, or may be separated.

In some implementations, the circuit board 12 may be connected to the drive and Hall integral IC 142 by using a patch. The wielding manner may be a reflow soldering process. The drive and Hall integral IC 142 may further be provided with a solder pad and a motor terminal output function.

Optionally, the circuit board 12 may be connected to an external drive circuit of the voice coil motor by using a connection portion 123.

The motor base part 11 described above and the coil fastening base 112, the coil 14, and the circuit board 12 that are disposed on the motor base part 11 may be considered as unmovable parts whose positions are not changed relative to a liquid lens sub-assembly 2 in a process of adjusting the liquid lens.

The magnet 13 is disposed on an inner side that is of the coil 14 and that is close to a motor cavity, and is configured to provide a magnetic field. The magnet 13 includes an N pole 131 and an S pole 132 that are disposed opposite to each other in the optical axis direction. A person of ordinary skill in the art may know that an N pole and an S pole of a magnet may be disposed based on a required magnetic field direction, and a disposing manner is not limited to the disposing manner in this embodiment of this application in which the N pole is on a front side of the S pole. The magnet 13 is fastened on an inner side face 152 of an inner side wall of the U-shaped separating magnetic piece 15, is located on the inner side of the coil 14, and is opposite to the coil 14. The coil 14 is located in the magnetic field of the magnet 13. After the coil 14 is powered on, under an action of the magnetic field, the coil 14 and the magnet 13 relatively move under an action of an Ampere's force. Because the coil 14 is fastened on the coil fastening base 112, the magnet 13 moves relative to the coil 14 along the optical axis direction under the action of the magnetic field.

An opening of the U-shaped separating magnetic piece 15 faces backward. Magnetic isolation space between the inner side face 152 of the inner side wall of the U-shaped separating magnetic piece 15 and an inner side face 153 of an outer side wall of the U-shaped separating magnetic piece 15 sequentially accommodates the magnet 13, the coil 14, the drive and Hall integral IC 142, and the circuit board 12 from inside out. The inner side face 153 of the outer side wall of the U-shaped separating magnetic piece 15 is opposite to an outer side face 122 of the circuit board 12. An outer side face 154 of the outer side wall of the U-shaped separating magnetic piece 15 is opposite to an inner wall of the housing 20. For the voice coil motor, corresponding to a setting of the coil 14, each sub motor part has one U-shaped separating magnetic piece. U-shaped separating magnetic pieces 15 of the plurality of sub motor parts are arranged on four sides of the motor in a direction perpendicular to the optical axis, and are configured to reduce magnetic leakage generated when the magnet and the coil are powered on, to increase a motor thrust force. A person of ordinary skill in the art may know that the U-shaped separating magnetic piece 15 may be correspondingly disposed in a manner of disposing the coil 14, and a manner listed in this embodiment of this application is not limited.

The connection elastic piece 18 is fastened on an outer side face 151 of the inner side wall of the U-shaped separating magnetic piece 15. The connection elastic piece 18 has a connection function, a power transfer connection, and a buffer function.

The connection elastic piece 18 is sheet-like. One end of the connection elastic piece 18 is fastened to the outer side face 151 of the inner side wall of the U-shaped separating magnetic piece 15, and the other end of the connection elastic piece 18 is fastened to the squeezing member 19. In this embodiment of this application, four connection elastic pieces 181a, 181b, 181c, and 181d are arranged on four sides of the voice coil motor. The arrangement of the four connection elastic pieces 181a, 181b, 181c, and 181d corresponds to arrangement of the plurality of sub motor parts. Each connection elastic piece is correspondingly connected to one U-shaped separating magnetic piece 15. Using the connection elastic piece 181*a* as an example, a second connection portion 1812 of the connection elastic piece 181*a* is connected to the outer side face 151 of the inner side wall of the U-shaped separating magnetic piece 15, and a first connection portion 1811 of the connection elastic piece 181*a* is connected to the squeezing member 19. A person of ordinary skill in the art may correspondingly set positions and a quantity of connection elastic pieces 18 based on a setting of the coil 14 or the magnet 13. It is not limited in this embodiment of this application that each sub motor part has one connection elastic piece. This is equivalent to that a total quantity of connection elastic pieces 18 of the plurality of sub motor parts is not limited to four, and a specific connection position of the connection elastic piece is also not limited.

In some possible implementations, the U-shaped separating magnetic piece 15 may be replaced with another shape of air gap pd in the voice coil motor, to prevent or reduce magnetic leakage of the magnet and the coil.

In some possible implementations, the voice coil motor may not include the U-shaped separating magnetic piece 15, and the magnet is connected to the connection elastic piece 18 by using another component or is directly connected to the connection elastic piece 18.

The connection elastic piece 18 may be a plate spring. A coefficient of stiffness of the connection elastic piece 18 in the optical axis direction is larger, that is, stiffness in the optical axis direction is larger. A coefficient of stiffness in a direction perpendicular to the optical axis is smaller. When a motor driving force applied to the connection elastic piece is within a preset motor driving force threshold, only minor deformation of the connection elastic piece 18 in the direction perpendicular to the optical axis is allowed. Therefore, the connection elastic piece 18 may be configured to transfer a driving force to the squeezing member part 19, to drive the squeezing member part 19 to move and ensure that the voice coil motor moves in a single direction. When a force applied to the connection elastic piece 18 in the optical axis direction exceeds the preset motor driving force threshold, larger bending and deformation of the connection elastic piece 18 may be allowed in the direction perpendicular to the optical axis. When the applied force in the optical axis direction disappears or is less than the preset motor driving force threshold, the connection elastic piece 18 recovers to an original state. Therefore, the connection elastic piece 18 may further have a buffer function when the applied force in the optical axis direction is relatively large, to protect other modules or the lens assembly in the voice coil motor. The following describes a working process of the connection elastic piece 18 with reference to FIG. 8 and FIG. 9, and details are not described herein.

The squeezing member part 19 includes a lug 191 and a squeezing portion 192. The lug 191 is disposed on a periphery of the squeezing portion 192, and is connected to the first connection portion 1811 of the connection elastic piece 18. The squeezing portion 192 is generally arc-shaped. A front-end face 1921 of the squeezing portion 192 is close to a rear side of the liquid lens 21, and is configured to squeeze the liquid lens to deform the liquid lens and further change a light entering path, so as to implement auto focus and optical image stabilization. In this embodiment of this application, four lugs 191*a*, 191*b*, 191*c*, and 191*d* of four squeezing member parts 19 are respectively connected to four connection elastic pieces 18. A person of ordinary skill in the art may know that the lug 191 of the squeezing member part 19 may be correspondingly disposed based on a manner of disposing the connection elastic piece.

In some implementations, the first connection portion 1811 of the connection elastic piece 18 is provided with a clamping jaw, the lug 191 is provided with a hole, and the clamping jaw is inserted into the hole. The lug 191 is driven by using the clamping jaw, so that the squeezing portion 192 squeezes the liquid lens 21.

Preferably, the squeezing member parts 19 of the plurality of sub motor parts may form an integral squeezing member. In this embodiment of this application, an integral squeezing member is used as an example. As shown in the figure, an integral squeezing member includes a circular squeezing portion and lugs disposed on a circumference of the circular squeezing portion.

In a process of adjusting the liquid lens, the magnet 13 and the U-shaped separating magnetic piece 15 that are described above may be considered as movable parts that can move relative to the liquid lens sub-assembly 2.

In this embodiment of this application, the sub motor part of the voice coil motor 1 further includes the lower support elastic piece 16 and the upper support elastic piece 17, which are configured to support and suspend the movable part. One end of the lower support elastic piece and one end of the upper support elastic piece are fastened to the movable part, and the other end of the lower support elastic piece and the other end of the upper support elastic piece are fastened to an unmovable part. Using the voice coil motor shown in the figure as an example, one end 161 of the lower support elastic piece 16 is fastened to the motor base part 11, and the other end 162 of the lower support elastic piece 16 is fastened to the U-shaped separating magnetic piece 15 and is configured to support a lower end of the U-shaped separating magnetic piece 15. For example, the end 161 of the lower support elastic piece 16 may be fastened to the integral baseplate 111 or the boss 113, and the other end 162 is fastened to the side face or a rear-end face of the side wall of the U-shaped separating magnetic piece 15. One end 171 of the upper support elastic piece 17 is fastened to the motor base part 11, and the other end 172 of the upper support elastic piece 17 is fastened to the top of the U-shaped separating magnetic piece 15 and is configured to support an upper end of the U-shaped separating magnetic piece 15. For example, the end 171 of the upper support elastic piece 17 is fastened to the coil fastening base 112, and the other end 172 of the upper support elastic piece 17 is fastened to the front-end face 155 of the U-shaped separating magnetic piece 15. Coefficients of stiffness of the upper support elastic piece 17 and the lower support elastic piece 16 are larger in the direction perpendicular to the optical axis, and coefficients of stiffness are smaller in the optical axis direction. Therefore, deformation of the upper support elastic piece 17 and the lower support elastic piece 16 is very minor in the direction perpendicular to the optical axis, and may be relatively large in the optical axis direction. Therefore, when a force is applied to the movable part, the movable part can move only along the optical axis direction, but cannot move in the direction perpendicular to the optical axis.

In some implementations, upper support elastic pieces of the plurality of sub motor parts may form an integral upper support elastic piece, and lower support elastic pieces of the plurality of sub motor parts may also form an integral lower support elastic piece. The integral upper support elastic piece and/or the integral lower support elastic piece are/is configured to support or suspend movable parts of the plurality of sub motor parts.

The upper support elastic piece 17 and the lower support elastic piece 16 that are described above may be considered as support parts having supporting and suspending functions in a process of adjusting the liquid lens. Certainly, the support parts may use any connection manner well known to a person of ordinary skill in the art, to implement a parallelogram-shaped anti-tilting structure.

The housing 20 is generally a closed square. An upper part of the housing 20 is provided with an opening. A supportive plate 201 is disposed on the housing 20. The supportive plate 201 is connected to the liquid lens sub-assembly 2, and is configured to support the liquid lens sub-assembly 2. The supportive plate 201 may be disposed at any proper position that is on an edge of the opening of the housing 20 and that can be implemented by a person of ordinary skill in the art. Space 202 formed by the housing 20 and the integral motor base is configured to accommodate the foregoing voice coil motor assembly.

The liquid lens sub-assembly 2 may include the liquid lens 21 and a supported frame 22 configured to fasten the liquid lens. The supportive plate 201 of the housing 20 may be connected to the supported frame 22 to support the liquid lens sub-assembly 2. The voice coil motor 1 may further include a drive circuit part, which is configured to perform closed-loop control over movement of the movable part. The drive circuit part is described in detail below, and details are not described herein.

The foregoing mainly describes the structure of one sub motor part. Structures of the plurality of sub motor parts may be the same. To be specific, the plurality of sub motor parts each include the parts, components, or assemblies described for one of the sub motor parts. Alternatively, structures of the plurality of sub motor parts may be different, but include parts, components, or assemblies having same functions as the foregoing parts, components, or assemblies. The plurality of sub motor parts may be mutually independent, or the plurality of sub motor parts may share a same component.

The plurality of sub motor parts may form an integral voice coil motor. Components of the plurality of sub motor parts may form an integral component. For example, the motor base parts of the plurality of sub motor parts may form an integral motor base, the circuit boards of the plurality of sub motor parts may form an integral circuit board, the squeezing member parts of the plurality of sub motor parts may form an integral squeezing member, and the upper support elastic pieces or the lower support elastic pieces may form an integral upper support elastic piece or an integral lower support elastic piece of the plurality of sub motor parts. Each sub motor part uses a part of the internal component as a part inside the sub motor part to implement a corresponding function.

Preferably, the plurality of sub motor parts included in the voice coil motor 1 are arranged on four sides of the voice coil motor around the optical axis. For example, in this embodiment of this application, the voice coil motor includes four sub motor parts. The four sub motor parts are arranged on four sides of the voice coil motor.

In conclusion, in this embodiment of this application, the voice coil motor includes the plurality of sub motor parts, and each sub motor part mainly includes the unmovable part, the movable part, the connection elastic piece, the support part, and the drive circuit part. The support part is configured to support and suspend the movable part. The drive circuit part is configured to drive the movable part to move, and finally change the curvature of the lens. This is equivalent to translation or rotation of the lens. Further, the focus is changed, to implement auto focus and optical image stabilization. Disposing of the connection elastic piece may enable the movable part of the voice coil motor to keep moving in a single direction, thereby ensuring a constant distance between the magnet and the coil, so that displacement of the liquid lens can be more precisely controlled. A specific working process of the voice coil motor is described in the following, and details are not described herein.

Figure 6:
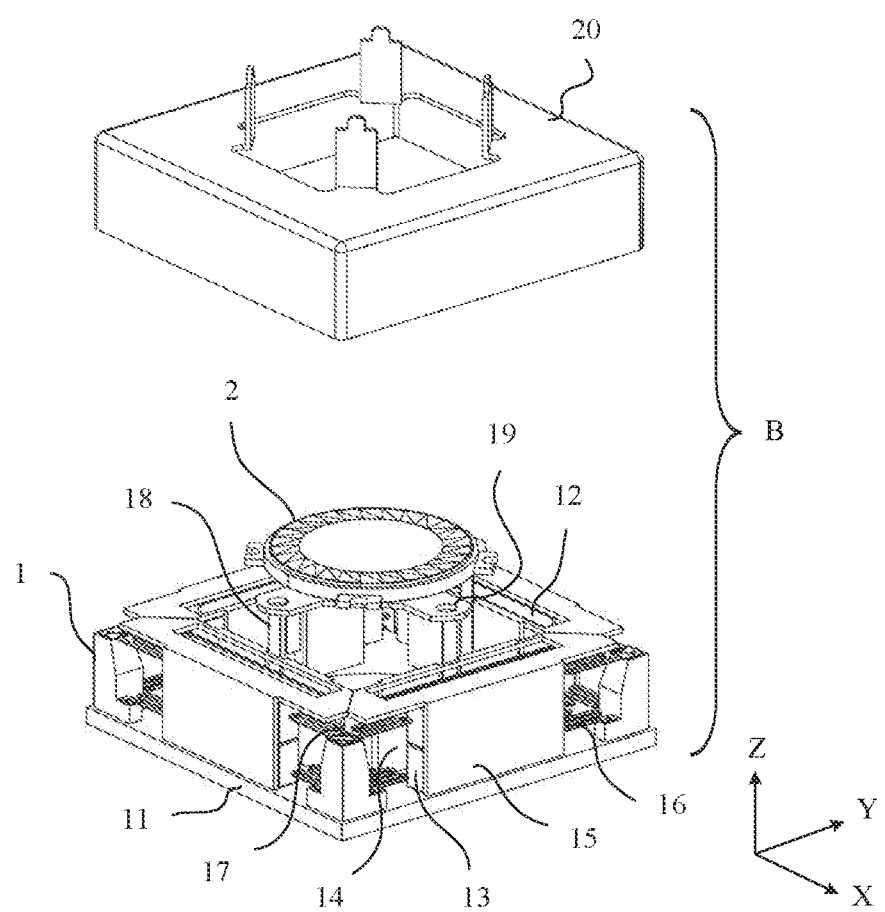
FIG. 6 is an exploded perspective view of a lens assembly according to another embodiment of this application.

FIG. 6 is an exploded perspective view of a lens assembly according to another embodiment of this application. The lens assembly B includes a voice coil motor 1, a liquid lens sub-assembly 2, and a housing 20.

As shown in FIG. 6, the voice coil motor 1 in the another embodiment of this application includes a plurality of sub motor parts, and the plurality of sub motor parts may be independently controlled. Each sub motor part mainly includes: a motor base part 11, a circuit board 12, a magnet 13, a coil 14, a U-shaped separating magnetic piece 15, a lower support elastic piece 16, an upper support elastic piece 17, a connection elastic piece 18, and a squeezing member part 19.

In this embodiment of this application, the voice coil motor includes four sub motor parts. The four sub motor parts are respectively located on four sides of the voice coil motor. It should be understood that, in some other implementations, the voice coil motor may include another quantity of sub motor parts, for example, three, six, eight, or more sub motor parts.

Figure 7:
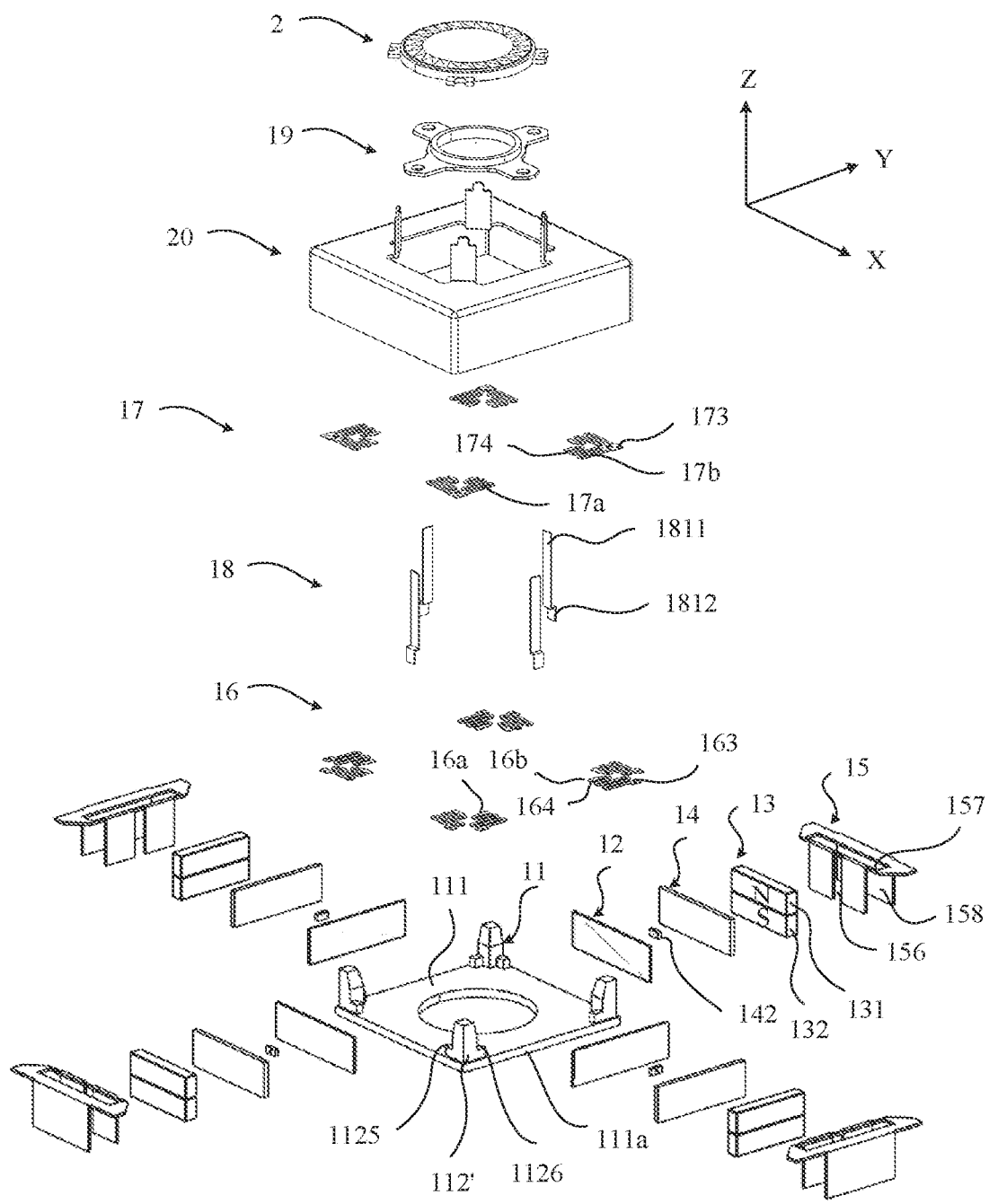
FIG. 7 is an exploded perspective view of a voice coil motor according to another embodiment of this application.

The voice coil motor 1 is integrally rectangular. Space formed by the housing 20 and motor base parts 11 of the plurality of sub motor parts is used to accommodate other assemblies of the voice coil motor or other assemblies of the lens assembly B. FIG. 7 is an exploded perspective view of the voice coil motor. The structure of the voice coil motor is described in detail below with reference to FIG. 7.

The motor base part 11 includes a baseplate part 111a and fastening bases 112'. The motor base part 11 is located on a rearmost side of the voice coil motor in the optical axis direction, or may alternatively be considered as being located at the bottom layer of the voice coil motor, and is configured to support a corresponding sub motor part structure. The motor base parts 11 of the plurality of sub motor parts are configured to support an entire motor and module structure.

The fastening bases 112' are disposed at two ends of a front-end face of the baseplate part 111a, and are configured to fasten the upper support elastic piece 17 and the lower support elastic piece 16. The fastening base 112' may be provided with an extension protrusion, which is configured to mechanically and electrically connected to the lower support elastic piece 16.

Preferably, the motor base parts 11 of the plurality of sub motor parts may form an integral motor base, in other words, baseplate parts 111a of the plurality of motor base parts may form an integral baseplate, neighboring sub motor parts may share one coil fastening base, and so on. In this embodiment of this application, an example in which an integral motor base is used for the voice coil motor is used for description. It should be understood that another structure disposed on the integral motor base is also applicable to motor base parts of a plurality of sub motors.

An integral motor base may include an integral baseplate 111 and fastening bases 112'. As shown in FIG. 7, the integral baseplate 111 is roughly rectangular, and a hole is formed at the center of the integral baseplate 111. The fastening bases 112' are disposed at four corners of the front-end face of the integral baseplate 111. The fastening base 112' is provided with extension protrusions 1125 and 1126, which are configured to mechanically connect to the lower support elastic piece 16. The extension protrusions 1125 and 1126 each are embedded with a power-on pin, which is configured to electrically connect to the lower support elastic piece 16. The top, that is, the front-end face, of the fastening base 112' is configured to mechanically connect to the upper support elastic piece 17. The fastening base 112 is embedded with a power-on pin, which is configured to electrically connect to the upper support elastic piece 17.

Certainly, in another implementation, the fastening base 112' may alternatively be disposed at another position of the integral baseplate 111, for example, disposed on four sides of the integral baseplate 111. A quantity of fastening bases 112' disposed on the integral baseplate 111 is not limited to four, and another quantity of fastening bases 112' may alternatively be disposed. A quantity of extension protrusions disposed on each fastening base 112' is not limited to two, and another quantity of extension protrusions may alternatively be disposed, for example, one extension protrusion.

Optionally, the fastening base 112' may be integrated with the integral baseplate 111, or may be connected to the integral baseplate 111 through welding, bonding, or the like.

The sub motor part of the voice coil motor further includes the lower support elastic piece 16 and the upper support elastic piece 17, which are configured to support and suspend the movable part. One end of the lower support elastic piece and one end of the upper support elastic piece are fastened to the movable part, and the other end of the lower support elastic piece and the other end of the upper support elastic piece are fastened to the unmovable part. The voice coil motor shown in FIG. 7 is used as an example for description.

Each sub motor part may include two lower support elastic pieces 16, for example, 16a and 16b shown in the figure. Using the lower support elastic piece 16b as an example, the lower support elastic piece 16b includes a first lower connection portion 163 and a second lower connection portion 164. The first lower connection portion 163 is connected to the extension protrusions of the fastening base 112'. The second lower connection portion 164 is connected to a rear end of the circuit board 12 by using a pin. In this way, the lower support elastic piece 16b is mechanically and electrically connected to the motor base part 11 and the circuit board 12.

Each sub motor part may include two upper support elastic pieces 17, for example, 17a and 17b shown in the figure. Using the upper support elastic piece 17b as an example, the upper support elastic piece 17b includes a first upper connection portion 173 and a second upper connection portion 174. The first upper connection portion 173 is connected to the front-end face of the fastening base 112'. The second upper connection portion 174 is connected to a front end of the circuit board 12 through a pin. In this way, the upper support elastic piece 17 is mechanically and electrically connected to the motor base part 11 and the circuit board 12.

In some implementations, two neighboring sub motor parts may share one upper support elastic piece. The upper support elastic piece may include one first upper connection portion and two second upper connection portions.

In some implementations, the upper support elastic piece 17 and the lower support elastic piece 16 each may be mechanically and electrically connected to the motor base part 11 and the circuit board 12 in another manner.

The coil 14 is fastened on an outer side face of the circuit board 12, and corresponds to the plurality of sub motor parts. In this embodiment of this application, there are four coils 14, which are perpendicular to the optical axis and are arranged on four sides of the motor.

The coil 14 may be a circular coil, or may be a coil in another shape. This is not specifically limited in this embodiment of this application. A quantity of coils 14 included in each sub motor part is not limited to one. A proper shape of coil 14 and a proper quantity of coils 14 may be configured based on a setting of the circuit board 12.

The circuit board 12 is further provided with a drive and Hall integral IC 142, configured to: perform closed-loop control, detect displacement of the voice coil motor, and drive, based on a detection result, the voice coil motor to move. The drive and Hall integral IC 142 is located at a middle position of the coil 14, and may be fastened on the outer side face of the circuit board 12 in a welding manner.

In some implementations, the circuit board 12 may be an FPCB, a PCB, or another electronic device that can implement coil wiring.

In some implementations, circuit boards 12 corresponding to all coils 14 of the plurality of sub motor parts may be integrated, or may be separated.

The magnet 13 is disposed on an outer side of the coil 14, is opposite to the coil 14, and is configured to provide a magnetic field. The magnet 13 includes an N pole 131 and an S pole 132 that are disposed opposite to each other in the optical axis direction. A person of ordinary skill in the art may know that an N pole and an S pole of a magnet may be disposed based on a required magnetic field direction, and a disposing manner is not limited to the disposing manner in this embodiment of this application in which the N pole is on a front side of the S pole. The magnet 13 is fastened on the inner side face 158 of the outer side wall of the U-shaped separating magnetic piece 15. The coil 14 is located in the magnetic field of the magnet 13. After the coil 14 is powered on, under an action of the magnetic field, the coil 14 and the magnet 13 relatively move under an action of an Ampere's force. In this embodiment of this application, the magnet is fastened on the U-shaped separating magnetic piece 15. The U-shaped separating magnetic piece 15 is fastened on the motor base part 11 or the housing 20. Therefore, the magnet is stationary. Under an action of the magnetic field, the coil 14 moves relative to the magnet 13 along the optical axis direction.

Each sub motor part may include one U-shaped separating magnetic piece. A quantity of U-shaped separating magnetic pieces corresponds to a quantity of sub motor parts. The four U-shaped separating magnetic pieces 15 of the plurality of sub motor parts are perpendicular to the optical axis and are arranged on four sides of the motor. The magnetic isolation space between the inner side wall and the outer side wall of the U-shaped separating magnetic piece 15 sequentially accommodates the circuit board 12, a drive and Hall integral IC, the coil 14, and the magnet 13 from inside out. The U-shaped separating magnetic piece 15 is configured to reduce magnetic leakage generated when the magnet and the coil are powered on. In this way, a motor thrust force is increased. A person of ordinary skill in the art may know that the U-shaped separating magnetic piece 15 may be correspondingly disposed in a manner of disposing the coil 14, and a manner listed in this embodiment of this application is not limited.

In some implementations, the circuit board 12 may be fastened on a fastening plate (not shown in the figure). The fastening plate is fastened on the inner side wall of the U-shaped separating magnetic piece 15.

The U-shaped separating magnetic piece 15 may be fastened on the motor base part 11 or the housing 20.

In this embodiment of this application, the magnet 13, the U-shaped separating magnetic piece 15, and the motor base part 11 may be considered as unmovable parts whose positions do not change relative to the liquid lens assembly 2 in a process of adjusting the liquid lens. Because the coil moves after being powered on, to transfer power, the connection elastic piece 18 is fastened on the inner side face of the circuit board 12, that is, the side face close to the motor cavity. The connection elastic piece 18 has a connection function, a power transfer function, and a buffer function. These functions are the same as those of the connection elastic piece in the foregoing embodiment. The connection elastic piece 18 and the connection elastic piece in the foregoing embodiment merely differ in structures. To facilitate movement of and a connection between the connection elastic piece 18 and the circuit board 12, an opening 156 is provided on the inner side wall of the U-shaped separating magnetic piece 15, and an opening 157 may further be provided on the front-end face of the U-shaped separating magnetic piece.

In some implementations, the opening of the U-shaped separating magnetic piece 15 may face forward, or another U-shaped separating magnetic piece design may be used, so that the U-shaped separating magnetic piece 15 does not interfere with movement of the coil 14 in the optical axis direction. The connection elastic piece 18 is sheet-like. One end of the connection elastic piece 18 is fastened to the inner side face of the circuit board 12, and the other end of the connection elastic piece 18 is connected to the squeezing member part 19. The second connection portion 1812 of the connection elastic piece 18 is connected to the inner side face of the circuit board 12, and the first connection portion 1811 of the connection elastic piece 18 is connected to the squeezing member part 19. In this embodiment of this application, each sub motor part includes one connection elastic piece. A quantity of connection elastic pieces corresponds to a quantity of sub motor parts. Four connection elastic pieces 18 of the plurality of sub motor parts are arranged on four sides of the voice coil motor. The connection elastic piece of the sub motor part is correspondingly connected to the circuit board 12. A person of ordinary skill in the art may correspondingly set positions and a quantity of connection elastic pieces 18 based on a setting of the coil 14 or the magnet 13. It is not limited in this embodiment of this application that a quantity of connection elastic pieces included in each sub motor part is one. This is equivalent to that a total quantity of connection elastic pieces 18 of the plurality of sub motor parts is not limited to four, and a specific connection position of the connection elastic piece is also not limited.

In some possible implementations, the U-shaped separating magnetic piece 15 may be replaced with another shape of air gap pd in the voice coil motor, to prevent or reduce magnetic leakage of the magnet and the coil.

In some possible implementations, the voice coil motor may not include the U-shaped separating magnetic piece 15, and the magnet 13 is connected to the motor base part 11 by using another component or is directly connected to the motor base part 11.

The connection elastic piece 18 may be a plate spring. A coefficient of stiffness of the connection elastic piece 18 in the optical axis direction is larger, that is, stiffness in the optical axis direction is larger. A coefficient of stiffness in a direction perpendicular to the optical axis is smaller. When a motor driving force applied to the connection elastic piece is within a preset motor driving force threshold, only minor deformation of the connection elastic piece 18 in the direction perpendicular to the optical axis is allowed. Therefore, the connection elastic piece 18 may be configured to transfer a driving force to the squeezing member part 19, to drive the squeezing member part 19 to move and ensure that the voice coil motor moves in a single direction. When a force applied to the connection elastic piece in the optical axis direction exceeds the preset motor driving force threshold, larger bending and deformation of the connection elastic piece may be allowed in the direction perpendicular to the optical axis. When the applied force in the optical axis direction disappears or is less than the preset motor driving force threshold, the connection elastic piece 18 recovers to an original state. Therefore, the connection elastic piece 18 may further have a buffer function when the applied force in the optical axis direction is relatively large, to protect other modules or the lens assembly in the voice coil motor.

In this embodiment of this application, the coil 14 and the circuit board 12 may be considered as movable parts that can move relative to the liquid lens sub-assembly 2 in a process of adjusting the liquid lens.

The upper support elastic piece 17 and the lower support elastic piece 16 are both support parts, and are configured to support and suspend the movable parts of the motor. Certainly, the support parts may use any connection manner well known to a person of ordinary skill in the art, to implement a parallelogram-shaped anti-tilting structure.

Structures of the housing 20, the squeezing member part 19, and the liquid lens sub-assembly 2 may be the same as corresponding structures in the foregoing embodiment. For details, refer to the foregoing description, and details are not described herein again.

Four metal pins 4, which are formed in an insert injection molding manner, of the circuit board 12 are respectively welded to four pins in total of the upper support elastic piece 17 and the lower support elastic piece 16. Connections of a drive IC, four drives of the plurality of sub motor parts, and a Hall integral IC are implemented.

The plurality of sub motor parts described above may form an integral voice coil motor. Components of the plurality of sub motor parts may form an integral component. For example, the motor base parts of the plurality of sub motor parts may form an integral motor base, the circuit boards of the plurality of sub motor parts may form an integral circuit board, the squeezing member parts of the plurality of sub motor parts may form an integral squeezing member, and the upper support elastic pieces or the lower support elastic pieces may form an integral upper support elastic piece or an integral lower support elastic piece of the plurality of sub motor parts. Each sub motor part uses a part of the internal component as a part inside the sub motor part to implement a corresponding function.

Preferably, the plurality of sub motor parts included in the voice coil motor 1 are arranged on four sides of the voice coil motor around the optical axis. For example, in this embodiment of this application, the voice coil motor includes four sub motor parts. The four sub motor parts are arranged on four sides of the voice coil motor.

In this embodiment of this application, the voice coil motor described above may further include a drive circuit part, which is configured to perform closed-loop control over a moving distance of the movable part. The drive circuit part may include the drive IC, the drive and Hall integral IC, a line connection, and the like. Descriptions of the drive circuit part are to be described below with reference to FIG. 10 and FIG. 11, and details are not described herein.

In the voice coil motor in this embodiment of this application, the support part is configured to support and suspend a movable assembly. The drive circuit part is configured to drive the movable part to move, and finally change the curvature of the lens. This is equivalent to translation or rotation of the lens. Further, the focus is changed, to implement auto focus and optical image stabilization. Disposing of the connection elastic piece may enable the movable part of the voice coil motor to keep moving in a single direction, thereby ensuring a constant distance between the magnet and the coil, so that displacement of the liquid lens can be more precisely controlled. A specific working process of the voice coil motor is described in the following, and details are not described herein.

In the voice coil motor in FIG. 2 to FIG. 7, the plurality of sub motor parts can be independently controlled, to evenly or unevenly squeeze the liquid lens. Because a force for squeezing the liquid lens is from an Ampere's force generated by the power-on coil in a magnetic field, it is equivalent to that four coils 14 included in the plurality of sub motor parts can be independently controlled. When generating, for the squeezing member part 19, driving forces of a same value and in a same direction, the plurality of sub motor parts 14 may be used for auto focus of the liquid lens. When generating, for the squeezing member part 19, driving forces of different values and/or in directions, the plurality of sub motor parts 14 may be used for optical image stabilization and/or auto focus. The following describes in detail several working state principles and processes of the voice coil motor with reference to FIG. 8 and FIG. 9.

However, it should be understood that the plurality of sub motor parts may alternatively be synchronously controlled or controlled in groups. The foregoing example in which the voice coil motor includes four sub motor parts and each sub motor part includes a coil and a magnet is used. A force for squeezing the liquid lens is from the Ampere's force generated by the power-on coil in the magnetic field. The four coils may be controlled, by using a same control instruction, to move at the same time; or two of the coils may be controlled, by using one instruction, to move, and the other two coils are controlled, by using another instruction, to move.

Figure 8:
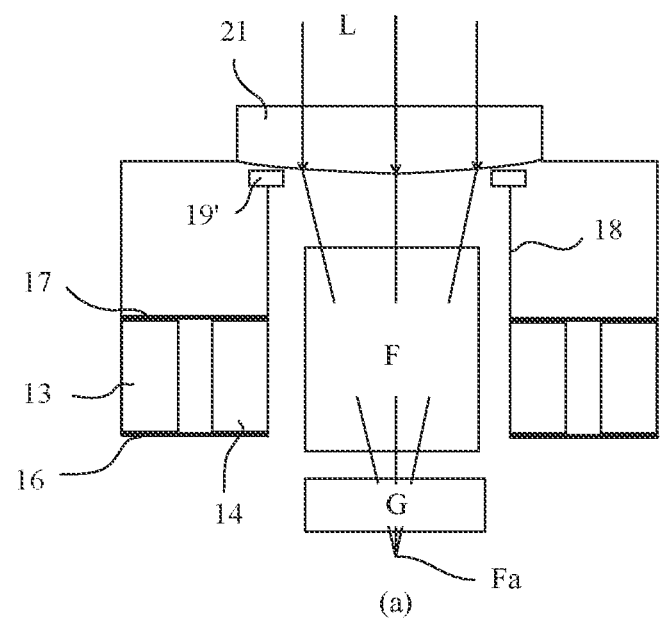
FIG. 8 is a schematic diagram of a working principle of a voice coil motor during auto focus according to an embodiment of this application.
Figure 8:
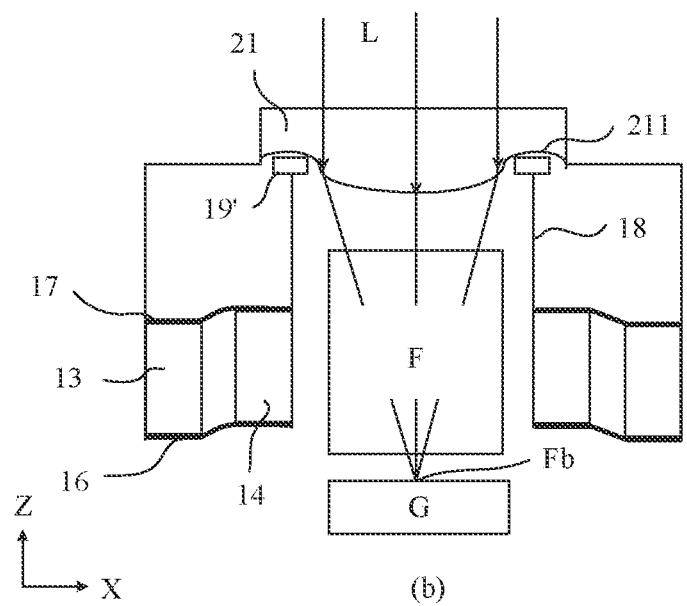

FIG. 8 is a diagram of a working principle of a voice coil motor used for auto focus according to an embodiment of this application. FIG. 8 is described only by using an example in which the movable part in the embodiment shown in FIG. 7 includes a coil and the unmovable part in the embodiment shown in FIG. 7 includes a magnet. A working principle of auto focus in an embodiment in which the movable part includes a magnet and the unmovable part includes a coil is the same as that in this embodiment.

It should be noted that, in the example in FIG. 8, for ease of understanding, squeezing member parts configured to squeeze a liquid lens in a plurality of sub motor parts form an integral squeezing member 19'. In addition, an inner structure of the voice coil motor is simplified in the schematic diagram, and components such as a U-shaped separating magnetic piece, a circuit board, and the like are not shown in the figure.

In FIG. 8, (a) shows a state of the voice coil motor before auto focus. After passing through the liquid lens 21 and a stationary lens F, light L reflected by a photographed object is converged at a point Fa below a sensor G. The point Fa is a focus of the current state. When a coil 14 is powered on, the power-on coil 14 is subjected to a magnetic field force in a magnetic field of a magnet 13. Because the magnet 13 is stationary and the coil 14 is a movable part, the coil 14 moves, under an action of the magnetic field force, relative to the magnet 13 along an optical axis direction. As shown in the figure, the coil 14 moves in a positive direction of Z. One end of a connection elastic piece 18 is fixedly connected to a U-shaped separating magnetic piece to which the coil 14 is fastened, and the other end of the connection elastic piece 18 is connected to the squeezing member 19'. Therefore, movement of the coil 14 in the direction Z drives both the connection elastic piece 18 and the squeezing member 19' to move along a direction Z. Further, the squeezing member 19' squeezes the liquid lens 21, thereby changing a curvature of the liquid lens 21. During auto focus, four coils 14 are independently controlled, and magnetic field forces applied to the four coils 14 are of a same value and in a same direction. In this case, the magnetic field forces applied to the four coils 14 are the same, and distances by which the four coils 14 move along the direction Z are the same. As can be learned, thrusts applied to the squeezing member 19' are the same, and distances by which the squeezing member 19' moves along the direction Z are the same. Therefore, a refracting surface 211 of the liquid lens 21 is evenly squeezed. Therefore, the focus moves from the focus Fa in (a) to a focus Fb along the direction Z. The focus Fb is located on the sensor. In this case, a formed image is clear. In addition, an upper support elastic piece 17 and a lower support elastic piece 16 ensure that the coil 14 does not move in a direction perpendicular to an optical axis, and the coil 14 moves only in the optical axis direction. The connection elastic piece 18 has very large stiffness in the optical axis direction. During normal working, a driving force of a motor is far less than a driving force threshold when the connection elastic piece obviously deforms. In addition, a thrust applied by the coil 14 to the connection elastic piece 18 does not have a force component or has a very small component value in the direction perpendicular to the optical axis, and therefore, the connection elastic piece 18 cannot deform in the direction perpendicular to the optical axis, so that the thrust of the coil 14 (which may also be considered as the driving force of the motor) can be transferred to the squeezing member 19', thereby implementing auto focus.

Figure 9:
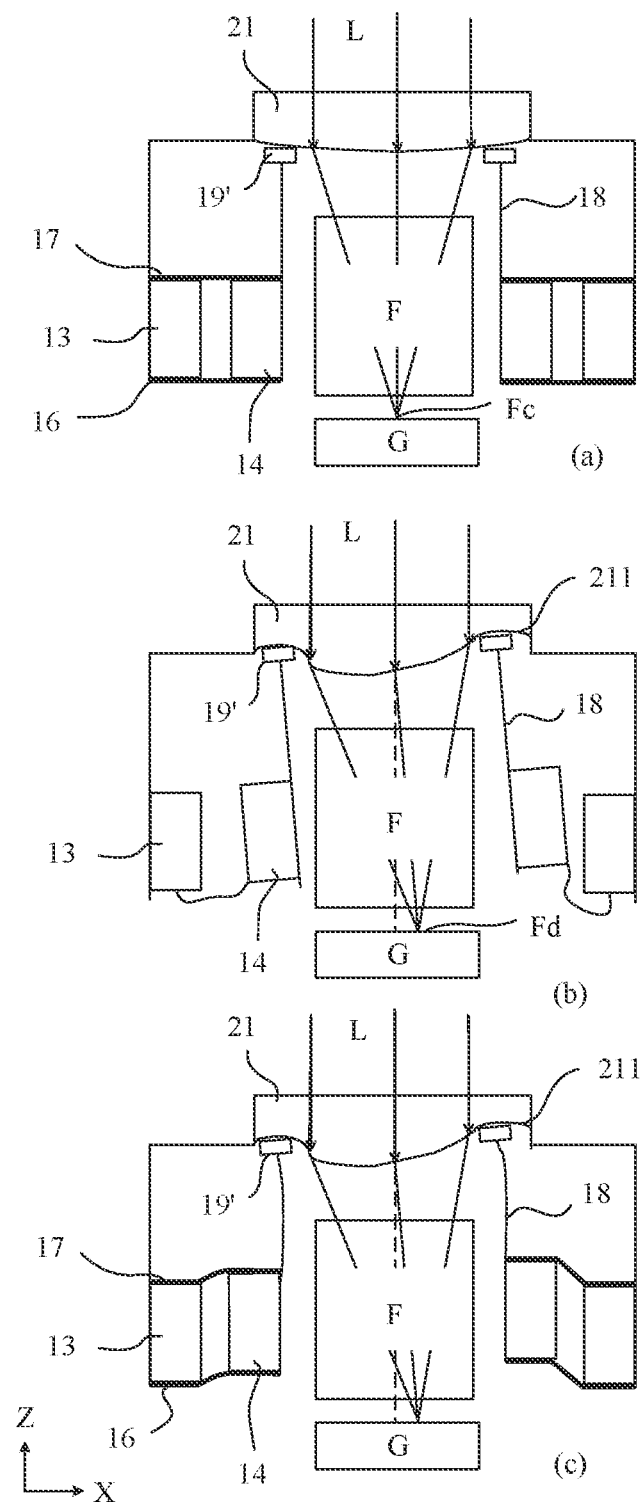
FIG. 9 is a schematic diagram of a working principle of a voice coil motor during optical image stabilization according to an embodiment of this application.

FIG. 9 is a working principle diagram of a voice coil motor used for optical image stabilization according to an embodiment of this application. Similarly, FIG. 8 is described only by using an example in which the movable part in the embodiment shown in FIG. 7 includes a coil and the unmovable part in the embodiment shown in FIG. 7 includes a magnet. A working principle of optical image stabilization in an embodiment in which the movable part includes a magnet and the unmovable part includes a coil is the same as that in this embodiment.

It should be noted that, in the example in FIG. 9, for ease of understanding, squeezing member parts configured to squeeze a liquid lens in a plurality of sub motor parts form an integral squeezing member 19'. In addition, an inner structure of the voice coil motor is simplified in the diagram, and components such as a U-shaped separating magnetic piece, a circuit board, and the like are not shown in the figure.

(a) in FIG. 9 shows a state of the voice coil motor before optical image stabilization. After passing through the liquid lens 21 and a stationary lens F, light L reflected by a photographed object is converged at a point Fc on a sensor G. The point Fc is a focus of the current state. When vibration occurs, the voice coil motor needs to perform optical image stabilization.

(b) and (c) in FIG. 9 show schematic diagrams of the voice coil motor used for optical image stabilization.

If a connection elastic piece 18 is rigid, the process in which the voice coil motor performs optical image stabilization is shown in (b). When the coil 14 is powered on, the power-on coil 14 moves along an optical axis direction under an action of a magnetic field force of the magnet 13. As can be learned from the figure, the coil 14 moves in a positive direction of Z, and further pushes the rigid connection elastic piece 18 and a squeezing member 19' to move along the direction Z. Because four coils 14 are independently controlled, and during optical image stabilization, a different magnetic field force is applied to each coil 14, magnetic field forces applied to the four coils 14 are not completely the same, and distances by which the four coils 14 move along the direction Z are not completely the same. As can be learned, thrusts applied to the squeezing member 19' are not completely the same, and distances by which the squeezing member 19' moves are not completely the same. Therefore, a refracting surface 211 of the liquid lens 21 is unevenly squeezed. In this way, the focus can deviate from the focus Fc in (a) to a focus Fd in (b), in other words, optical image stabilization is implemented. In an optical image stabilization process, if the connection elastic piece 18 is rigid, and moving distances of four connection elastic pieces 18 are not completely the same, the squeezing member 19' is rotated. Because both upper and lower ends of the connection elastic piece 18 are fixedly connected, rotation of the squeezing member 19' causes rotation of the connection elastic piece 18. This is equivalent to that tilting of the connection elastic piece 18 drives tilting of the coil 14. After the coil 14 tilts, a distance between the coil 14 and the magnet 13 changes. Consequently, a value of a current input into the coil cannot accurately correspond to corresponding displacement. Therefore, deformation of the liquid lens cannot be precisely controlled.

In this embodiment of this application, the specially designed connection elastic piece 18 is used, so that the movable part of the voice coil motor can keep moving in a single direction during optical image stabilization. The following provides description with reference to (c) in FIG. 9. Stiffness of the connection elastic piece 18 in the optical axis direction is far greater than stiffness of the connection elastic piece 18 in another direction. When the coil 14 is powered on, the power-on coil 14 moves along the direction Z under an action of a magnetic field force of the magnet 13, and further pushes the connection elastic piece 18 and the squeezing member 19' to move along the direction Z. Because four coils 14 are independently controlled, and during optical image stabilization, a different magnetic field force is applied to each coil 14, magnetic field forces applied to the four coils 14 are not completely the same, and distances by which the four coils 14 move along the Z direction are not completely the same. As can be learned, thrusts applied to the squeezing member 19' are not completely the same, and distances by which the squeezing member 19' moves are not completely the same. Therefore, when the squeezing member 19' connected to the connection elastic piece 18 is rotated, under an action generated by rotation of the squeezing member, the connection elastic piece may bend in a direction perpendicular to the optical axis, and convert tilt motion that should be performed by the coil 14 into bending of the connection elastic piece, thereby eliminating impact of rotation of the squeezing member 19' on the coil 14. A component value of a force of the connection elastic piece in the direction perpendicular to the optical axis is too small to obviously deform the connection elastic piece 18 in the direction perpendicular to the optical axis. Therefore, it can be ensured that a thrust of the coil 14 (which may also be considered as a driving force of a motor) is transferred to the squeezing member 19'. In addition, an upper support elastic piece 17 and a lower support elastic piece 16 ensure that the coil 14 does not move in the direction perpendicular to the optical axis, thereby ensuring that the coil 14 moves only in the optical axis direction, that is, moves only in a single direction. The movable part of the voice coil motor keeps moving in a single direction during optical image stabilization, thereby ensuring a constant distance between the magnet and the coil, so that a current value of the coil well corresponds to displacement of the movable part. In this way, deformation of the liquid lens is precisely controlled. In addition, in this embodiment of this application, the drive and Hall integral IC is used in the drive circuit part to perform closed-loop control over displacement of the movable part. Movement of the movable part in a single direction can also ensure accuracy of displacement detection performed by the drive and Hall integral IC on the movable part, thereby accurately controlling deformation of the liquid lens during closed-loop control.

In this embodiment of this application, the voice coil motor may independently implement auto focus of the liquid lens, for example, the process shown in FIG. 8; and may independently implement optical image stabilization of the liquid lens, for example, the process shown in FIG. 9. Because the movable part of the voice coil motor moves in a single direction, the voice coil motor may implement both auto focus and optical image stabilization of the liquid lens.

When the voice coil motor performs both auto focus and optical image stabilization, because the four coils may be independently controlled, calculation may be performed on a moving distance required for auto focus and a moving distance required for optical image stabilization in a superposition and combination manner, so that the movable part of the voice coil motor only needs to move by a specific distance in the optical axis direction to enable an imaging focus of a photographed object to deviate as well as move along the optical axis direction. In this way, both auto focus and optical image stabilization are implemented.

Therefore, in this embodiment of this application, by using the design of the connection elastic piece, the voice coil motor can ensure a constant distance between the magnet and the coil, so that the current input into the coil can accurately correspond to displacement of the movable part. This facilitates accurate control over deformation and displacement of the liquid lens, and the voice coil motor only needs to move in the optical axis direction to implement both auto focus and optical image stabilization.

In some cases, when a force that is in the optical axis direction and that is applied to the connection elastic piece is greater than a designed driving force value, the connection elastic piece has a relatively large force component value in the direction perpendicular to the optical axis, so that the connection elastic piece obviously deforms, and cannot transfer a force. For example, when a lens module falls down, a relatively large force is generated for the connection elastic piece, and the obvious deformation of the connection elastic piece causes incomplete transfer of the force to the liquid lens, thereby implementing a buffer function, and protecting a component in the lens module.

Figure 10:
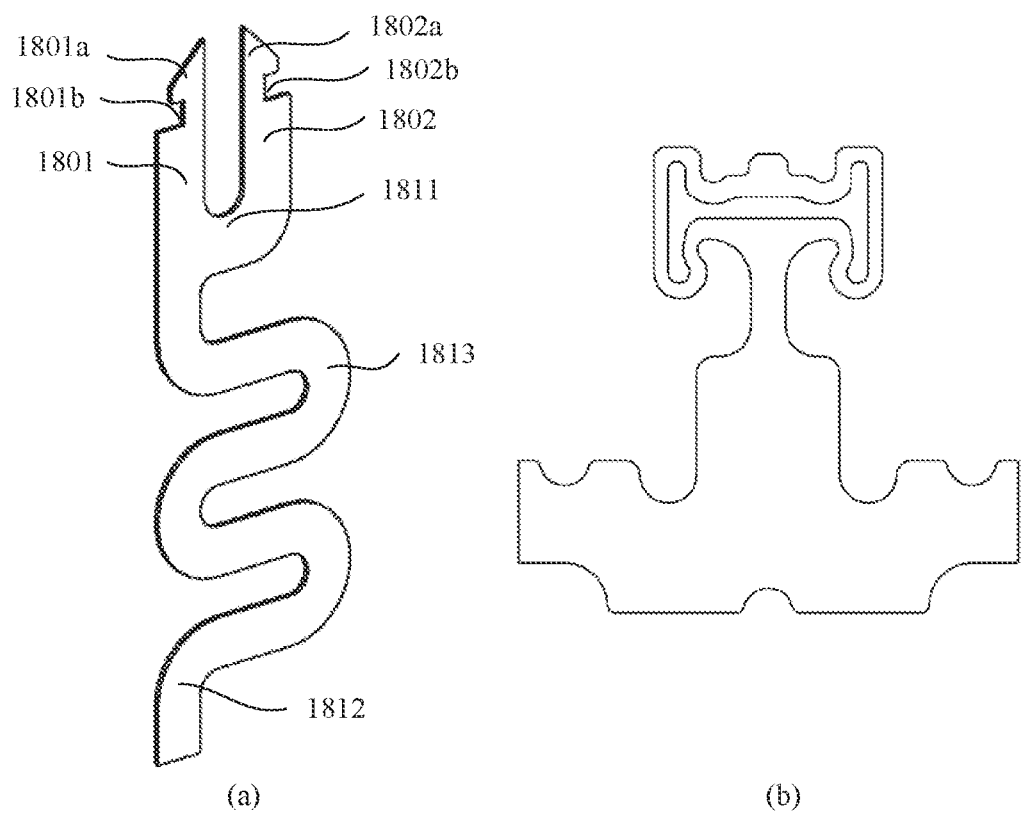
FIG. 10 is a schematic structural diagram of a connection elastic piece according to an embodiment of this application.

The following describes in more detail a specific and non-limiting example of the connection elastic piece in this embodiment of this application. FIG. 10 is a schematic structural diagram of a connection elastic piece according to an embodiment of this application.

In this embodiment of this application, the connection elastic piece is a plate spring. A coefficient of stiffness of the connection elastic piece may also be referred to as a stubbornness coefficient, a stiffness coefficient, or an elastic coefficient, and is used to describe a value of an elastic force generated when a unit of deformation occurs. The coefficient of stiffness is usually represented by k. A larger value of k indicates a larger force required in deformation of a unit length. In other words, the elastic piece is "flexible". A value of the coefficient of stiffness is equal to an elastic force generated when the spring extends (or contracts) for a unit length. The value of the coefficient of stiffness is related to a material and the thickness of the elastic piece and a temperature. When other conditions are determined, a lower temperature indicates a larger value of k.

In this embodiment of this application, the coefficient of stiffness of the connection elastic piece is larger in an optical axis direction, and the coefficient of stiffness of the connection elastic piece is smaller in a direction perpendicular to an optical axis. Therefore, stiffness of the connection elastic piece in the optical axis direction is far greater than stiffness of the connection elastic piece in another direction, so that the connection elastic piece does not easily extend or bend in the optical axis direction, and easily bends in a plane with smallest stiffness, that is, the direction perpendicular to the optical axis. When a force that is in the optical axis direction and that is applied to the connection elastic piece is less than a designed motor driving force, a force that is in the direction perpendicular to the optical axis and that is applied to the connection elastic piece is very small, so that only minor deformation of the connection elastic piece is allowed. When the force that is in the optical axis direction and that is applied to the connection elastic piece is greater than the designed motor driving force, a component value of the force that is in the direction perpendicular to the optical axis and that is applied to the connection elastic piece is relatively large, so that relatively large bending and deformation of the connection elastic piece in the direction perpendicular to the optical axis may be caused.

In this embodiment of this application, when the foregoing designed motor driving force is determined, impact of another factor is ignored, and only an ideal state which a force is applied to the connection elastic piece is considered. A maximum force applied to the connection elastic piece to deform the connection elastic piece in the optical axis direction is obtained through simulation or theoretical calculation, that is, a support force of the connection elastic piece resisting, in the optical axis direction, deformation of the connection elastic piece in the optical axis direction. The designed motor driving force is less than the force that deforms the connection elastic piece in the optical axis direction. This is equivalent to that in a working process of the motor, a maximum driving force generated by the magnet and the coil is the designed motor driving force, and is less than the force that deforms the connection elastic piece in the optical axis. An actual situation is more complex than the ideal state. A person skilled in the art may adjust the designed motor driving force based on the actual situation or by considering another factor.

FIG. 10 shows some specific non-limiting examples of the connection elastic piece. As shown in (a) of FIG. 10, a connection elastic piece 18 is sheet-like. The example in the figure is a snake-shaped plate spring. The connection elastic piece 18 has a first connection portion 1811 and a second connection portion 1812, and may further include a middle portion 1813 between the first connection portion 1811 and the second connection portion 1812.

The first connection portion 1811 is connected to a squeezing member 19'. Specifically, the first connection portion 1811 includes two clamping jaws 1801 and 1802. Ends that are of the clamping jaws 1801 and 1802 and that are close to the middle portion 1813 are connected to each other, and the other ends of the clamping jaws 1801 and 1802 are separated for a distance. Using the clamping jaw 1801 as an example, the clamping jaw 1801 is provided with a tilting portion 1801a. Due to existence of a sloping side, the tilting portion 1801a of the clamping jaw 1801 and the tilting portion 1802a of the clamping jaw 1802 may be inserted into the lug that is of the squeezing member 19' and whose inner diameter is less than the width of the connection elastic piece. In the insertion process, the lug applies a force to the tilting portions 1801a and 1802a. Because this end of the clamping jaw 1801 is not connected to this end of the clamping jaw 180, the clamping jaw 1801 becomes close to the clamping jaw 1802 under the action of the force, to get inserted into the lug. A position that is on the clamping jaw 1801 and that is close to the tilting portion 1801a is provided with an opening 1801b. The width of the opening 1801b is slightly greater than the height of the lug. When the lug slides to the opening 1801b and an opening 1802b, because the force applied to the tilting portions 1801a and 1802a decreases or is no long applied, under an elastic deformation action of the clamping jaw, the clamping jaw 1801 and the clamping jaw 1802 depart away from each other, so that the openings 1801b and 1802b are stuck on the lug. In this way, the first connection portion 1811 of the connection elastic piece 18 is connected to the squeezing member.

The second connection portion 1812 of the connection elastic piece 18 is connected to a movable part of a sub motor part. The second connection portion 1812 of the connection elastic piece 18 may be directly connected to the movable part of the sub motor part, for example, through welding or bonding; or may be indirectly connected to the movable part of the sub motor part, for example, by using another part.

The middle portion 1813 of the connection elastic piece 18 may be curved, straight, or both curved and linear. The first connection portion 1811, the middle portion 1813, and the second connection portion 1812 of the connection elastic piece 18 may be on a same plane, or may be on different planes. If the first connection portion 1811, the middle portion 1813, and the second connection portion 1812 are on different planes, the connection elastic piece 18 may further be provided with a part configured to connect the first connection portion 1811 and the middle portion 1813 on the different planes and a part configured to connect the middle portion 1813 and the second connection portion 1812 on the different planes.

In this embodiment of this application, the connection elastic piece may have a plurality of variants. (b) in FIG. 10 is another non-limiting example of the connection elastic piece in this embodiment of this application. A specific connection manner of the connection elastic piece may be determined based on structures of the squeezing member and the movable part, and is merely an example herein. The specific structure of the connection elastic piece is not described in detail herein again.

In this embodiment of this application, the connection elastic piece may be made of a material such as copper alloy, tin-bronze, zinc-bronze, beryllium-bronze, or silicon-manganese steel.

It should be understood that, in this embodiment of this application, any design form well known in the prior art may be used for the connection elastic piece, for example, the snake-shaped plate spring shown in FIG. 5 or the rectangular straight plate spring shown in FIG. 7, or the connection elastic piece may be a trapezoidal plate spring, a triangular plate spring, a stage-shaped plate spring, or the like, provided that the stiffness of the connection elastic piece in the optical axis direction is far greater than the stiffness of the connection elastic piece in the direction perpendicular to the optical axis. A person of ordinary skill in the art may know that a person skilled in the art may obtain, based on teachings of the structure of the connection elastic piece shown in this embodiment of this application, many other variant connection elastic pieces that can implement the function of the connection elastic piece in this embodiment of this application. It should be understood that these variant connection elastic pieces all fall within the protection scope of this application.

Figure 11:
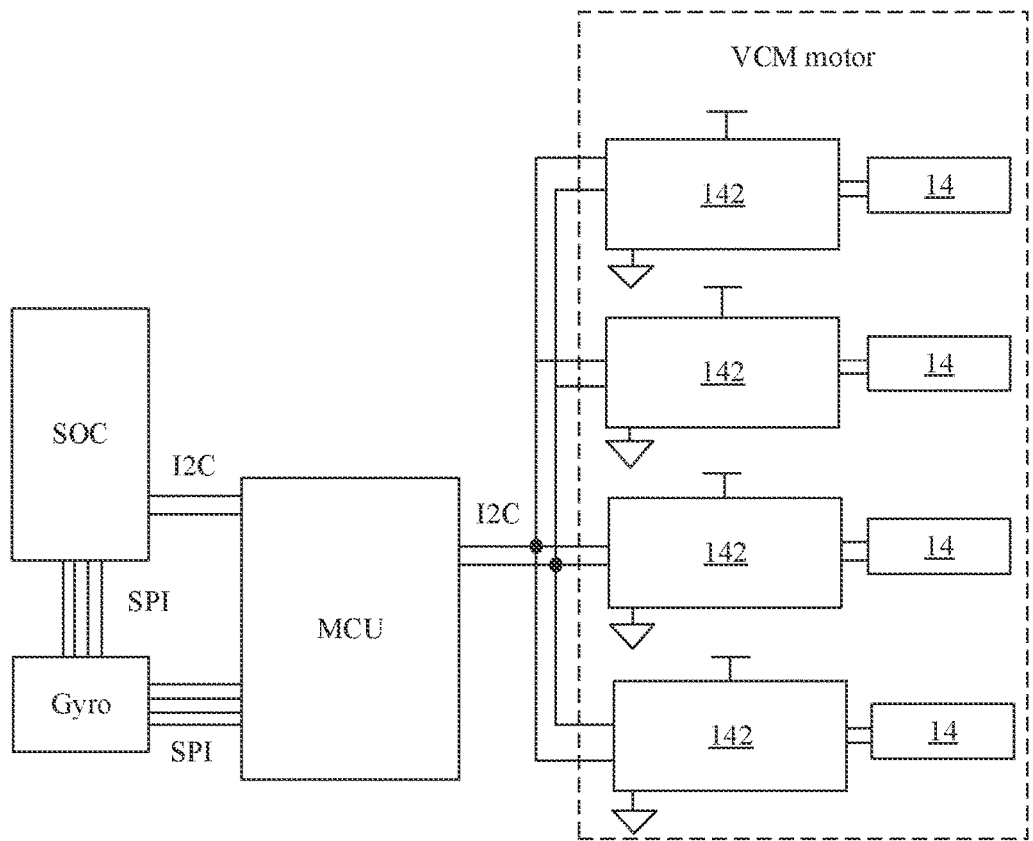
FIG. 11 is a schematic block diagram of circuit connections according to an embodiment of this application.

A sub motor part of the voice coil motor is driven by a drive circuit during movement. For example, a movable part of the voice coil motor is usually driven by a drive circuit part. FIG. 11 is a diagram of line connections according to an embodiment of this application.

A plurality of sub motor parts in the voice coil motor each may use a separate drive circuit and a separate drive device, or may share a drive circuit and a drive device, or may certainly share some drive circuits and some drive devices. In this embodiment of this application, the plurality of sub motor parts of the voice coil motor each have a drive and Hall integral IC, and may share a micro control unit. The following describes only the driving circuit parts of the four sub motor parts in the examples in the embodiments of this application as a whole.

According to the structures of the voice coil motors in the foregoing embodiments, the drive circuit part of the voice coil motor in this embodiment of this application includes four drive and Hall integral ICs 142 and one micro control unit (microcontroller unit, MCU). The four drive and Hall integral ICs 142 are located in the middle of four coils 14 of the voice coil motor. The MCU is located on a module baseplate or another baseplate outside the voice coil motor. The voice coil motor includes four sub motor parts, and each sub motor part includes one coil. Therefore, the voice coil motor includes four coils 142, two leading wires are led from each coil to a corresponding drive and Hall integral IC 142, and the MCU is connected to four drive and Hall integral ICs 142 in parallel through two I2C communications wires. That is, four wires in total may be led from the voice coil motor, and include two communications wires, one power cable, and one grounding wire. The MCU is connected to a system on chip (system on chip, SOC) through the I2C communications wires, the MCU is connected to a gyro (gyro) through a serial peripheral interface (serial peripheral interface, SPI), and the SOC is connected to the gyro through the SPI. In this embodiment of this application, because the drive and Hall integral ICs are disposed inside the voice coil motor, a quantity of leading wires of the motor is greatly reduced.

In some implementations, an OIS driver IC or another logic device may be used to replace the micro control unit MCU to implement a function of the MCU in the embodiments of this application.

In some implementations, wiring of the coil and the drive and Hall integral IC may be performed on a circuit board 12, and a power-on pin may be embedded in a motor base 11 to implement line connections inside and outside the voice coil motor.

It should be understood that, in the line connections in this embodiment of this application, a quantity of drive and Hall integral ICs is determined based on a design of the voice coil motor.

Figure 12:
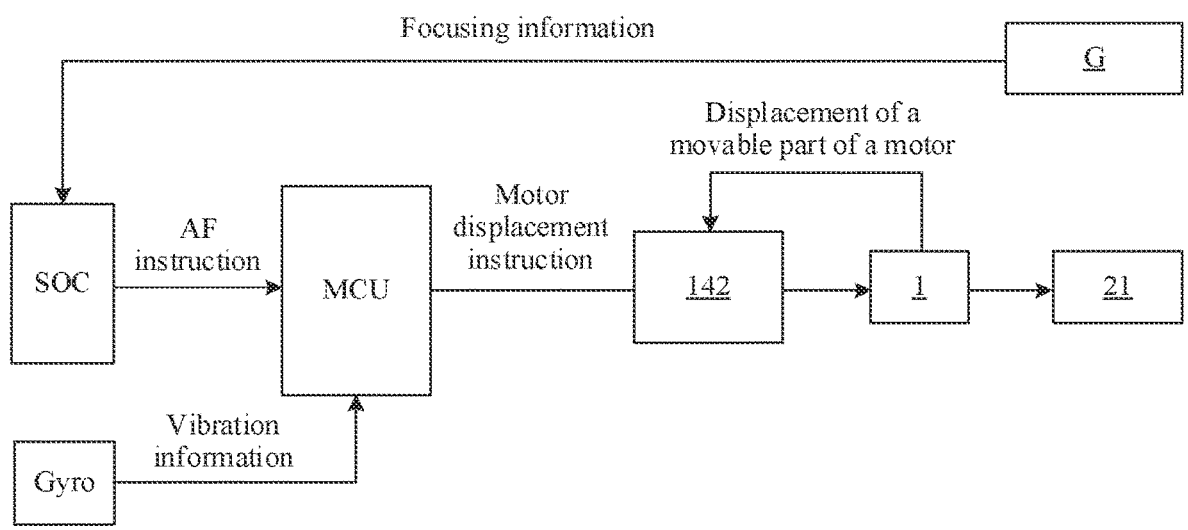
FIG. 12 is a schematic diagram of a control procedure of auto focus and optical image stabilization of a voice coil motor according to an embodiment of this application.

FIG. 12 is a control flowchart of auto focus and optical image stabilization of a voice coil motor.

As shown in FIG. 11, after detecting image-related information, an image sensor G uses focusing information such as image definition as input information, and inputs the input information into an SOC. A memory of the SOC stores an image processing algorithm, and the SOC can calculate an AF instruction based on read image data. The AF instruction may indicate a distance by which the voice coil motor 1 needs to move for auto focus. A gyro may detect vibration information such as an angular velocity and an angular acceleration, use the AF instruction and the vibration information as input information, and input the input information into an MCU. The MCU has a calculation function, and the MCU may obtain a motor displacement instruction through calculation based on the vibration information and the AF instruction by using a superposition and combination algorithm, and input the motor displacement instruction into a drive and Hall integral IC 142. The motor displacement instruction indicates a final moving distance by which the voice coil motor 1 needs to move to implement both auto focus and optical image stabilization. After the drive and Hall integral IC 142 drives a movable component of a motor to move, a Hall sensor detects displacement of the movable component of the motor, and performs closed-loop control over the motor inside the drive and Hall integral IC 142. The displacement of the movable part of the motor may enable a change in a curvature of a liquid lens 21, thereby implementing auto focus and optical image stabilization.

Optionally, when calculating the motor displacement instruction, the MCU may calculate an OIS instruction based on the vibration information. The OIS instruction may indicate a distance by which the voice coil motor 1 needs to move for optical image stabilization. Then, the MCU sends the AF instruction, to instruct to add the distance by which the voice coil motor 1 moves to the distance by which the OIS instruction instructs the voice coil motor 1 to move, to obtain a final moving distance of the voice coil motor 1.

Optionally, the MCU may input different voice coil motor displacement instructions to four drive and Hall integral ICs 142. In other words, each drive and Hall integral IC 142 may drive a corresponding movable component of the motor to move by a different distance, to independently control the four drive and Hall integral ICs 142. In some other embodiments, the MCU may not perform superimposition and fusion on the AF instruction and the OIS instruction. Instead, the two instructions are separately into the drive and Hall integral ICs; or the SOC may process the focusing information and the vibration information, to obtain the motor displacement instruction.

A person of ordinary skill in the art may be aware that the connections described in this specification include direct connections and indirect connections that are implemented by using intermediate elements.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voice coil motor, comprising:
a plurality of sub motor parts that is capable of being independently controlled, wherein each of the sub motor parts comprises:
   an unmovable part comprising:
      a motor base part;
      a circuit board coupled to the motor base part; and
      a coil on the circuit board and electrically coupled to the circuit board;
   a movable part capable of moving along an optical axis direction relative to the unmovable part and comprising:
      a magnet disposed opposite to the coil; and
      a U-shaped separating magnetic piece that forms a magnetic isolation space accommodating the coil and the circuit board, wherein the U-shaped separating magnetic piece comprises:
         an inner side wall, wherein the magnet is coupled on the inner side wall; and
         an outer side wall;
   a driver circuit part configured to control a moving distance of the movable part; and
   a connection elastic piece coupled to a liquid lens and the movable part,
   wherein the connection elastic piece is a plate spring,
   wherein a lower part of the connection elastic piece is fixedly coupled to the outer side wall,
   wherein a first stiffness coefficient of the connection elastic piece in the optical axis direction is greater than a second stiffness coefficient of the connection elastic piece in a direction perpendicular to the optical axis direction, and
   wherein the movable part is configured to drive the connection elastic piece to squeeze the liquid lens when a force is applied to the movable part in the optical axis direction.

2. A lens assembly, comprising:
a liquid lens; and
a voice coil motor configured to drive the liquid lens and comprising:
   a plurality of sub motor parts that is capable of being independently controlled,
wherein each of the sub motor parts comprises:
   an unmovable part comprising:
      a first motor base part;
      a circuit board coupled to the first motor base part; and
      a coil on the circuit board and electrically coupled to the circuit board;
   a movable part capable of moving along an optical axis direction relative to the unmovable part and comprising:
      a magnet disposed opposite to the coil; and
      a U-shaped separating magnetic piece that forms a magnetic isolation space accommodating the coil and the circuit board, wherein the U-shaped separating magnetic piece comprises:
         an inner side wall, wherein the magnet is coupled on the inner side wall; and
         an outer side wall:
   a drive circuit part configured to control a moving distance of the movable part; and
   a connection elastic piece coupled to the liquid lens and the movable part,
   wherein the connection elastic piece is a plate spring,
   wherein a lower part of the connection elastic piece is fixedly coupled to the outer side wall,
   wherein a first stiffness coefficient of the connection elastic piece in the optical axis direction is greater than a second stiffness coefficient of the connection elastic piece in a direction perpendicular to the optical axis direction, and
   wherein the movable part is configured to drive the connection elastic piece to squeeze the liquid lens when a force is applied to the movable part in the optical axis direction.

3. The lens assembly of claim 2, wherein second motor base parts of the sub motor parts form an integral motor base.

4. The lens assembly of claim 2, wherein the drive circuit part comprises a drive and Hall integrated circuit located at a center of the coil and coupled on the circuit board to implement a first closed-loop control over the moving distance.

5. The lens assembly of claim 2, wherein each of the sub motor parts further comprises a squeezing member part, and wherein the squeezing member part comprises:
   a first arc squeezing portion comprising a circumference; and
   a lug disposed on the circumference and coupled to the connection elastic piece.

6. The lens assembly of claim 5, wherein second arc squeezing portions of the sub motor parts form an integral circular squeezing portion.

7. The lens assembly of claim 2, wherein each of the sub motor parts further comprises:
   a first upper support elastic piece comprising:
      a first end proximate to a motor cavity and coupled to the movable part; and
      a second end coupled to the unmovable part; and
   a first lower support elastic piece comprising:
      a third end proximate to the motor cavity and coupled to the movable part; and
      a fourth end coupled to the unmovable part, and
   wherein the first upper support elastic piece and the first lower support elastic piece are configured to support and suspend the movable part.

8. The lens assembly of claim 7, wherein second upper support elastic pieces of the sub motor parts form an integral upper support elastic piece, or wherein second lower support elastic pieces of the sub motor parts form an integral lower support elastic piece.

9. The lens assembly of claim 2, wherein the sub motor parts are arranged on four sides of the voice coil motor around an optical axis.

10. The lens assembly of claim 2, wherein a maximum driving force generated from interaction of the coil and the magnet is less than a force that deforms the connection elastic piece in the optical axis direction.

11. The lens assembly of claim 2, further comprising a housing having an opening, wherein the housing coordinates with second motor base parts of the sub motor parts, and wherein the housing and the second motor base parts form a space that accommodates the voice coil motor and the liquid lens.

12. The lens assembly of claim 11, further comprising a liquid lens support bracket, wherein the housing comprises a supportive plate coupled to the liquid lens support bracket.

13. A lens assembly, comprising:
a liquid lens; and
a voice coil motor configured to drive the liquid lens and comprising:
- a plurality of sub motor parts that is capable of being independently controlled,
wherein each of the sub motor parts comprises:
- an unmovable part comprising:
  - a motor base part;
  - a magnet that is stationary relative to the motor base part; and
  - a U-shaped separating magnetic piece that forms a magnetic isolation space and comprises:
    - an inner side wall, wherein the magnet is fastened to the inner side wall; and
    - a first side wall having an opening along an optical axis direction;
- a movable part capable of moving along the optical axis direction relative to the unmovable part and comprising:
  - a circuit board; and
  - a coil coupled on the circuit board and disposed opposite to the magnet, wherein the coil and the circuit board are accommodated by the magnetic isolation space;
- a drive circuit part configured to control a moving distance of the movable part; and
- a connection elastic piece coupled to the liquid lens and the movable part,
wherein the connection elastic piece is a plate spring,
wherein a lower part of the connection elastic piece is fixedly coupled to the circuit board,
wherein the connection elastic piece is configured to drive, through the opening, the circuit board to move,
wherein a first stiffness coefficient of the connection elastic piece in the optical axis direction is greater than a second stiffness coefficient of the connection elastic piece in a direction perpendicular to the optical axis direction, and
wherein the movable part is configured to drive the connection elastic piece to squeeze the liquid lens when a force is applied to the movable part in the optical axis direction.

14. The lens assembly of claim 13, wherein each of the sub motor parts further comprises a squeezing member part, and wherein the squeezing member part comprises:
- a first arc squeezing portion comprising a circumference; and
- a lug disposed on the circumference and coupled to the connection elastic piece.

15. The lens assembly of claim 14, wherein second arc squeezing portions of the sub motor parts form an integral circular squeezing portion.

16. The lens assembly of claim 13, wherein each of the sub motor parts further comprises:
- a first upper support elastic piece comprising:
  - a first end proximate to a motor cavity and coupled to the movable part; and
  - a second end coupled to the unmovable part; and
- a first lower support elastic piece comprising:
  - a third end proximate to the motor cavity and coupled to the movable part; and
  - a fourth end coupled to the unmovable part, and
wherein the first upper support elastic piece and the first lower support elastic piece are configured to support and suspend the movable part.

17. The lens assembly of claim 16, wherein second upper support elastic pieces of the sub motor parts form an integral upper support elastic piece, or wherein second lower support elastic pieces of the sub motor parts form an integral lower support elastic piece.

18. The lens assembly of claim 13, wherein the sub motor parts are arranged on four sides of the voice coil motor around an optical axis.

19. A lens assembly, comprising:
a liquid lens; and
a voice coil motor configured to drive the liquid lens and comprising:
- a plurality of sub motor parts that is capable of being independently controlled,
wherein each of the sub motor parts comprises:
- an unmovable part comprising:
  - a first motor base part;
  - a circuit board on the first motor base part; and
  - a coil on the circuit board and electrically coupled to the circuit board;
- a movable part capable of moving along an optical axis direction relative to the unmovable part and comprising a magnet disposed opposite to the coil;
- a drive circuit part configured to control a moving distance of the movable part; and
- a connection elastic piece coupled to the liquid lens and the movable part,
wherein the connection elastic piece is a plate spring,
wherein a first stiffness coefficient of the connection elastic piece in the optical axis direction is greater than a second stiffness coefficient of the connection elastic piece in a direction perpendicular to the optical axis direction,
wherein the movable part is configured to drive the connection elastic piece to squeeze the liquid lens when a force is applied to the movable part in the optical axis direction, and
wherein a maximum driving force generated from interaction of the coil and the magnet is less than a force that deforms the connection elastic piece in the optical axis direction.

20. The lens assembly of claim 19, wherein the drive circuit part comprises a drive and Hall integrated circuit located at a center of the coil and coupled on the circuit board to implement a first closed-loop control over the moving distance.

* * * * *

UNITED STATES PATENT AND TRADEMARK OFFICE
CERTIFICATE OF CORRECTION

Page 1 of 1

PATENT NO. : 12,078,818 B2
APPLICATION NO. : 17/434661
DATED : September 3, 2024
INVENTOR(S) : Taihong Xia et al.

It is certified that error appears in the above-identified patent and that said Letters Patent is hereby corrected as shown below:

On the Title Page

Page 2, (56) Cited References, Foreign Patent Documents Line 9: "CN 103454749 12/2017" should read "CN 103454749 A 12/2013"

Signed and Sealed this
First Day of October, 2024

Katherine Kelly Vidal
*Director of the United States Patent and Trademark Office*